US007739000B2

(12) United States Patent
Kevaler

(10) Patent No.: US 7,739,000 B2
(45) Date of Patent: Jun. 15, 2010

(54) METHOD AND APPARATUS REPORTING A VEHICULAR SENSOR WAVEFORM IN A WIRELESS VEHICULAR SENSOR NETWORK

(75) Inventor: Robert Kevaler, Kensington, CA (US)

(73) Assignee: Sensys Networks, Inc, Berkeley, CA (US)

( * ) Notice: Subject to any disclaimer, the term of this patent is extended or adjusted under 35 U.S.C. 154(b) by 1106 days.

(21) Appl. No.: 11/167,810

(22) Filed: Jun. 27, 2005

(65) Prior Publication Data

US 2006/0109104 A1 May 25, 2006

Related U.S. Application Data

(60) Provisional application No. 60/630,366, filed on Nov. 22, 2004, provisional application No. 60/549,260, filed on Mar. 1, 2004.

(51) Int. Cl.

| | |
|---|---|
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl. .......................... 701/1; 701/117; 701/118; 340/905; 340/917; 340/933; 340/938; 340/940; 340/941; 340/942; 340/943; 324/247; 324/207.26; 324/174; 324/179

(58) Field of Classification Search ..................... 701/1, 701/117, 118; 340/905, 917, 933, 941, 940, 340/938, 942, 943; 324/247, 207.26, 174, 324/179

See application file for complete search history.

(56) References Cited

U.S. PATENT DOCUMENTS

| | | | | |
|---|---|---|---|---|
| 4,361,202 | A * | 11/1982 | Minovitch | 180/168 |
| 5,491,475 | A * | 2/1996 | Rouse et al. | 340/933 |
| 5,648,904 | A * | 7/1997 | Scott | 701/117 |
| 5,748,108 | A * | 5/1998 | Sampey et al. | 340/933 |
| 5,859,415 | A * | 1/1999 | Blomqvist et al. | 235/384 |
| 5,877,705 | A * | 3/1999 | Sampey | 340/933 |
| 5,880,682 | A * | 3/1999 | Soulliard et al. | 340/907 |
| 6,016,109 | A * | 1/2000 | Yosida et al. | 340/941 |
| 6,208,268 | B1 * | 3/2001 | Scarzello et al. | 340/941 |

(Continued)

OTHER PUBLICATIONS

Applicantion Note-AN218: Vehicle Detection Using AMR Sensors http://www.ssec.honeywell.com/magnetic/datasheets/an218.pdf.*

(Continued)

*Primary Examiner*—Khoi Tran
*Assistant Examiner*—Jorge O Peche
(74) *Attorney, Agent, or Firm*—Earle Jennings

(57) ABSTRACT

At least one waveform characteristic of a vehicular sensor waveform is reported in a wireless vehicular sensor network. The vehicular sensor waveform results a vehicle's presence near a wireless vehicular sensor node. The waveform characteristic may be rising edge, falling edge, waveform duration and/or waveform midpoint of vehicular sensor waveform. Report transmission uses at least one wireless physical transport. Transmitting the report may initiate a response across the wireless physical transport, preferably from an access point, an acknowledgement of receiving the report. The transmitted report may be received by an access point in the wireless vehicular sensor network. The wireless vehicular sensor network may create any of a vehicular traffic report, a vehicular parking report, and/or a vehicular speeding report, based upon the received vehicular sensor waveform report.

45 Claims, 13 Drawing Sheets

U.S. PATENT DOCUMENTS

| | | | | |
|---|---|---|---|---|
| 6,559,774 | B2 * | 5/2003 | Bergan et al. | 340/908 |
| 6,662,099 | B2 * | 12/2003 | Knaian et al. | 701/117 |
| 6,781,523 | B2 * | 8/2004 | Matsui et al. | 340/910 |
| 6,825,778 | B2 * | 11/2004 | Bergan et al. | 340/936 |
| 6,885,311 | B2 * | 4/2005 | Howard et al. | 340/932.2 |
| 7,382,238 | B2 * | 6/2008 | Kavaler | 340/438 |
| 7,382,281 | B2 * | 6/2008 | Kavaler | 340/941 |
| 7,382,282 | B2 * | 6/2008 | Kavaler | 340/941 |
| 7,388,517 | B2 * | 6/2008 | Kavaler | 340/941 |
| 7,391,339 | B2 * | 6/2008 | Howard et al. | 340/932.2 |
| 7,515,997 | B2 * | 4/2009 | Imai | 701/1 |
| 2002/0145541 | A1 * | 10/2002 | Matsui et al. | 340/934 |
| 2002/0177942 | A1 * | 11/2002 | Knaian et al. | 701/117 |
| 2006/0097894 | A1 * | 5/2006 | Kavaler | 340/941 |
| 2006/0132298 | A1 * | 6/2006 | Kavaler | 340/521 |
| 2006/0202863 | A1 * | 9/2006 | Kavaler | 340/941 |

OTHER PUBLICATIONS

D.E. Culler etal, “Wireless Sensor Networks: Introduction” Comm. of A.C.M., Jun. 2004, pp. 30-33.

R. Szewczyk etal, “Habitat monitoring with Sensor Networks”, Comm. of A.C.M., Jun. 2004, pp. 34-40.

J. Hill, “The platforms enabling wireless sensor networks”, Comm. of A.C.M., Jun. 2004, pp. 41-46.

A. Woo etal, “Netowkring support for query processing in sensor networks”, Comm. of A.C.M., Jun. 2004, pp. 47-52.

A. Perrig etal, “Security in wireless sensor networks”, Comm. of A.C.M., Jun. 2004, pp. 53-57.

Honeywell, “1, 2, and 3 Axis Magnetic Sensors”, Honeywell product datasheet, versions available at least 2004, pp. 1-12.

M. Caruso etal, “Vehicle detection & Compass Applications using AMR Magnetic Sensors”, Honeywell, since 2004, pp. 1-13.

B. Pant etal, “Magnetic Sensor Cross-Axis Effect”, Honeywell App Note AN-205, since 2004, pp. 1-6.

Honeywell, “Vehicle detection using AMR sensors” Honeywell App Note AN-218, since 2004, pp. 1-10.

* cited by examiner

METHOD AND APPARATUS REPORTING A VEHICULAR SENSOR WAVEFORM IN A WIRELESS VEHICULAR SENSOR NETWORK

CROSS REFERENCES TO RELATED PATENT APPLICATIONS

This application is also a continuation in part of U.S. application No. 60/630,366, filed Nov. 22, 2004, which claims priority to Provisional Patent Application Ser. No. 60/549,260, filed Mar. 1, 2004 and Provisional Patent Application Ser. No. 60/630,366, filed Nov. 23, 2004, all of which are incorporated herein by reference.

TECHNICAL FIELD

This invention relates to wireless vehicular sensor networks, in particular, to the reporting of the waveforms of these sensors due to the presence of motor vehicles.

BACKGROUND OF THE INVENTION

There are some wireless sensor networks able to report that a motor vehicle passed near a vehicle sensor, but they cannot report the waveform of the vehicle sensor. Such networks can be used for counting the traffic passing near the vehicle sensor, but they are unable and/or difficult to use in other applications. By way of example, they cannot report the presence of a vehicle waiting for a traffic signal to change, because the vehicle has not necessarily passed the vehicle sensor. Consequently, they may be of little or no use for traffic signal control systems. What is needed is a method and apparatus for wireless vehicular sensor networks able to detect the presence of a motor vehicle whether or not the vehicle passes the sensor node.

Today, there are many parking facilities and controlled traffic regions where knowing the availability of parking spaces on a given floor or region would be an advantage, but costs too much to implement. Again, there is a central need to sense when a vehicle is present but not necessarily unmoving.

Today, many parking facilities and controlled traffic regions must identify and log vehicles upon entry and exist. This process is expensive, often requiring personnel. Wireless vehicular sensor networks unable to report the vehicular sensor waveform are much more complicated to deploy, the vehicular sensors must be placed to insure that the vehicle has passed a vehicular sensor to trigger identifying and logging the vehicle. What is needed are inexpensive mechanisms providing the vehicular sensor waveforms, supporting this service. What is needed are low cost, reliable mechanisms for monitoring entry and exit from these facilities and regions using these wireless vehicular sensor networks.

Today, many traffic authorities use a radar based velocity detection approach to apprehend motorists driving vehicles at illegal speeds. These radar based systems are relatively inexpensive, but are detectable by culprits who equip their vehicles with radar detection devices. Consequently, the motorists who traffic authorities most want to penalize, often avoid detection of their illegal activities. While alternative optical speed detection systems exist, they have proven very expensive to implement. What is needed is a low cost, reliable mechanism for vehicle velocity detection identifying the vehicle violating the traffic laws.

SUMMARY OF THE INVENTION

The invention reports at least one waveform characteristic of a vehicular sensor waveform in a wireless vehicular sensor network. The vehicular sensor waveform is the result of a vehicle passing near a wireless vehicular sensor node. The waveform characteristic may be the rising edge, the falling edge, the waveform duration, the waveform midpoint, the rising edge slope, the falling edge slope, number of zero crossings and/or number of zero crossings of the time derivative of the vehicular sensor waveform. Preferably, the events are reported in terms of a synchronized timing of rising edges and falling edges.

In a parking facility, where many vehicles remain stationary for extended periods of time, reporting the waveform duration or alternatively, the waveform midpoint, may preferably indicate that vehicle is parked. Alternatively, in traffic control situations such as shown in, reporting the rising edge and/or falling edge can help indicate length of a vehicle, which can further help in estimating vehicle velocity. Basically, upon reporting any two of the rising edge, the falling edge, the waveform midpoint, and the waveform duration, the velocity and length of the vehicle can be estimated, which is important in traffic control applications.

Transmitting the report uses at least one wireless physical transport. The wireless physical transport may include any of an ultrasonic physical transport, a radio-frequency physical transport, and/or an infrared physical transport.

The transmitting the report may be spread across a frequency band of the wireless physical transport. More particularly, the transmitting the report of the vehicular sensor waveform may include a chirp and/or a spread spectrum burst across the frequency band.

The report may further identify the wireless vehicular sensor node originating the report. The report may be relayed through an intermediate wireless node, which may or may not be a wireless sensor node. The identification may preferably be determined by when the vehicular sensor node transmits the report.

Transmitting the report of the vehicular sensor waveform may initiate a response across the wireless physical transport, preferably from an access point. The response may be an acknowledgement of receiving the report.

The wireless physical transport may also be used to send a synchronization signal to the wireless vehicular sensor nodes. The wireless vehicular sensor nodes may each maintain a local clock, synchronized by the clock synchronization sent across the wireless physical transport.

The report of the vehicular sensor waveform may be encoded in a packet format, which may be modulated and frequency converted. More than one vehicular sensor waveforms may preferably be encoded into one packet. The packets may be transmitted using a wireless communication protocol over the wireless physical transport. The acknowledgement and/or the synchronization message may be encoded in a packet. If the acknowledgement is not received by the vehicular sensor node, the next report preferably appends any new waveform characteristics to the report.

The transmitting of the report of the vehicle sensor waveform may preferably create a received vehicular sensor waveform report from the wireless vehicular sensor node, which may preferably be received by an access point in a wireless vehicular sensor network. The wireless vehicular sensor network may include more than one access point. The wireless vehicular sensor network may include a sensor report analyzer creating any of a vehicular traffic report, a vehicular parking report, and/or a vehicular speeding report, based upon the received vehicular sensor waveform report. The sensor report analyzer may be implemented in an access point. Alternatively, the sensor report analyzer may receive the received vehicular sensor waveform report from the access point. The received vehicular sensor waveform report may further include an indication of the wireless vehicular sensor node at which the vehicular sensor waveform originated.

The wireless vehicular sensor node may further preferably include: means for maintaining the clock count to create the task trigger and the task identifier. And means for operating the radio transceiver and the vehicular sensor based upon the task identifier, when the task trigger is active.

The wireless vehicular sensor node may further preferably include means for controlling the power from the power source delivered to the radio transceiver and the vehicular sensor based upon the task trigger and the task identifier.

One or more computers, field programmable logic devices, and/or finite state machines may be included to implement these means.

The means for controlling the power may preferably minimize delivery of power to preferably all circuitry when the task trigger is inactive, or the task identifier does not indicate the need for the circuitry, where the circuitry includes the transmitter and/or transceiver, the vehicular sensor, the computer, as well as other circuits, such as memory. The power consumption of the minimized circuitry may preferably be less than 100 micro-watts (μw), further preferably less than 30 μw. The means for maintaining the clock count may be powered most of the time. The means for maintaining may couple with a clock crystal. The clock crystal may preferably operate at approximately 32K Herz (Hz), where 1K is 1024.

At least two of the means for maintaining, the means for controlling, and the means for operating may preferably be housed in a single integrated circuit. Preferably, all three means may be housed in the single integrated circuit. Also, the single integrated circuit may house the transmitter and/or the transceiver and/or the vehicular sensor. The wireless vehicular sensor node may include an antenna coupled with the transmitter and/or the transceiver. The antenna may preferably be a patch antenna.

The power source, may preferably include at least one battery, and may further preferably include at least one solar cell.

The vehicular sensor may preferably use a form of the magnetic resistive effect. The vehicular sensor preferably includes a more than one axis magneto-resistive sensor to create a vehicle sensor state. The vehicular sensor may preferably include a two axis magneto-resistive sensor and/or a three axis magneto-resistive sensor.

The radio transceiver preferably implements a version of at least one wireless communications protocol, preferably the IEEE 802.15.4 communications standard. It uses at least one channel of the wireless communication protocol. It may use a second channel to communicate with a vehicle radio transceiver associated and/or attached to the vehicle.

The wireless vehicular sensor node may further include a light emitting structure, used to visibly communicate during installation and/or testing a vehicular sensor network.

BRIEF DESCRIPTION OF THE DRAWINGS

FIGS. 7A to 9A shows flowcharts of the program system of FIG. 4, implementing the invention's method of responding to the presence of a vehicle at the wireless vehicular sensor node;

DETAILED DESCRIPTION

This invention relates to wireless vehicular sensor networks, in particular, to the reporting of the waveforms of these sensors due to the presence of motor vehicles. The presence of a motor vehicle will refer to its presence whether stationary and/or in motion relative to the vehicular sensor node. By way example, an automobile passing near a vehicular sensor node at 20 Kilometers Per Hour (kph) will have a presence. That same automobile parked near a second vehicular sensor node will also have a presence. The invention reports at least one waveform characteristic of a vehicular sensor waveform in a wireless vehicular sensor network. The vehicular sensor waveform is the result of a vehicle passing near a wireless vehicular sensor node. The waveform characteristic may be the rising edge, the falling edge, the waveform duration, the waveform midpoint, the rising edge slope, the falling edge slope, the number of zero crossings, and/or the number of zero-crossings of the time derivative of the vehicular sensor waveform.

Figure 1A:
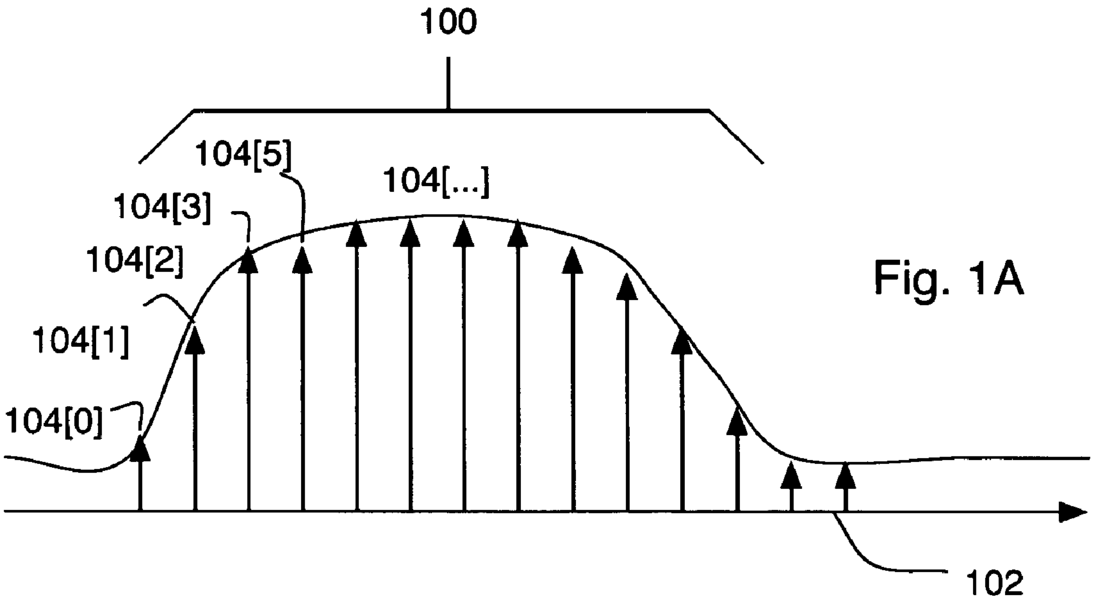
FIGS. 1A to 1C show various aspects of a vehicular sensor waveform created by the invention in response to the presence of a vehicle.
Figure 1B:
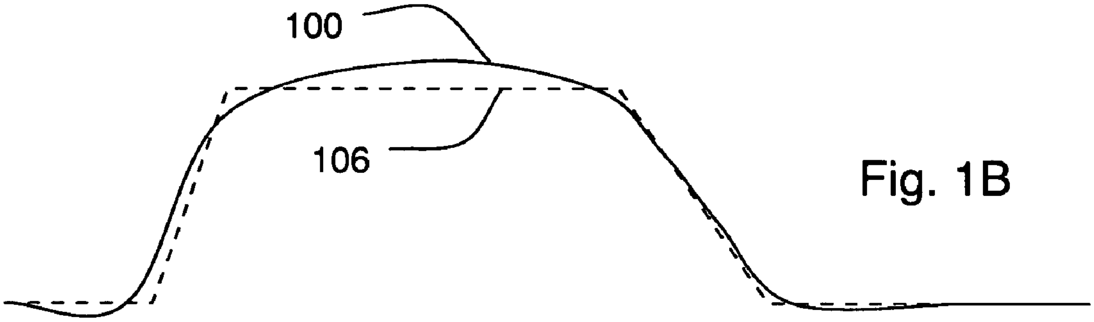
Figure 1C:
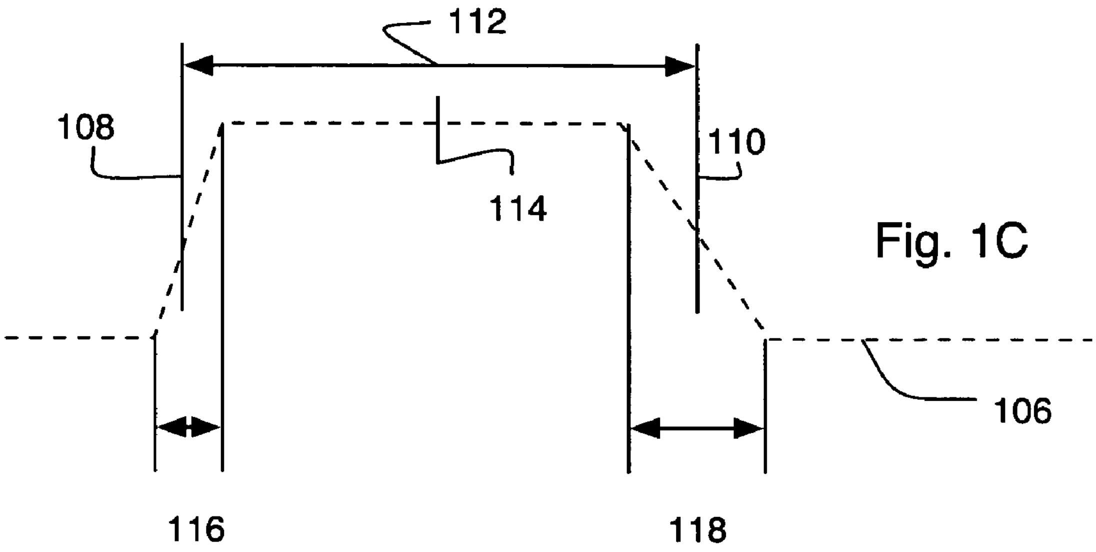

FIGS. 1A to 1C show various aspects of a vehicular sensor waveform created by the invention in response to the presence of a vehicle. FIGS. 2 to 6B show various examples of embodiments of the wireless vehicular sensor node and the access points included the wireless vehicular sensor networks, as well as the installation of the wireless vehicular sensor node in FIG. 5. FIGS. 7A to 9A and 12 show aspects of the invention's method of responding to the presence of a motor vehicle. FIG. 9B shows some details of an example of the report generated and sent by the wireless vehicular sensor node. And FIG. 9C shows some details of the acknowledgement of the report. FIGS. 10A to 11C show a more detailed, and often preferred method of creating the vehicular sensor waveform.

Figure 2:
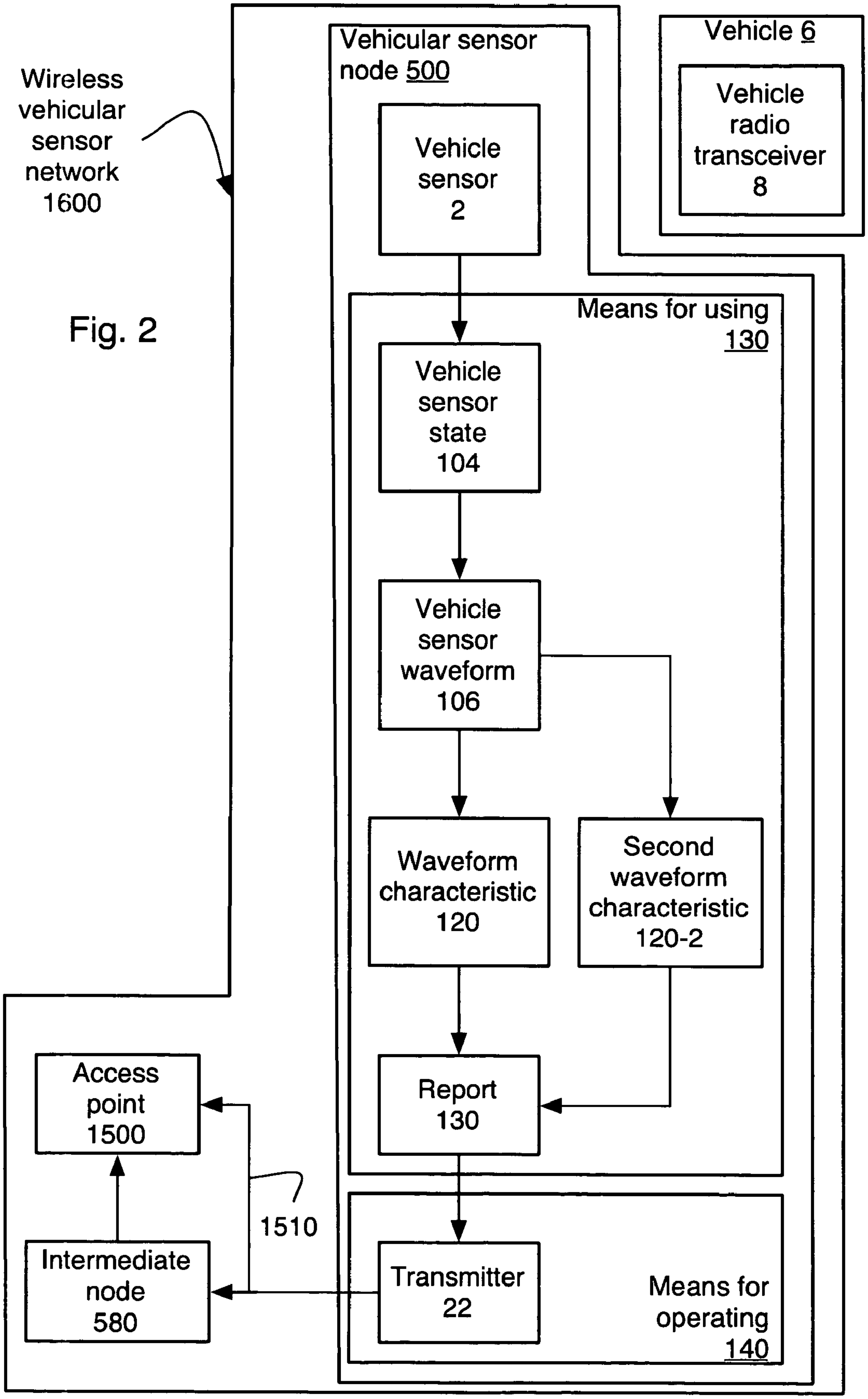
FIG. 2 shows an example of a wireless vehicular sensor node responding to the presence of a vehicle.

FIGS. 1A to 1C show various aspects of the vehicular sensor waveform 106 created by the invention in response to the presence of a vehicle 6, as shown in FIG. 2. A vehicle sensor state 104, is collected over time 102, to create the vehicular sensor waveform, which may preferably be represented by at least one waveform characteristic 120. Such a waveform characteristic may represent a rising edge 108, a falling edge 110, a waveform midpoint 114, and/or a waveform duration 112. In a parking facility, where many vehicles remain stationary for extended periods of time, reporting the waveform duration or alternatively, the waveform midpoint, may preferably indicate that vehicle is parked. Alternatively, in traffic control situations such as shown in FIG. 6B, reporting the rising edge and/or falling edge can help indicate length of a vehicle, which can further help in estimating vehicle velocity. Basically, upon reporting any two of the rising edge, the falling edge, the waveform midpoint, and the waveform duration, the velocity and length of the vehicle can be estimated, which is important in traffic control applications.

Figure 10A:
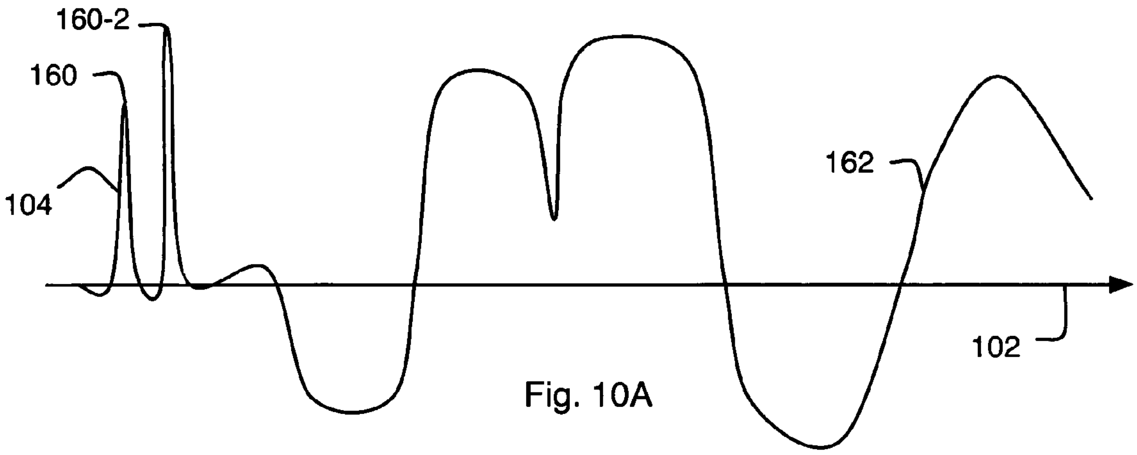
FIGS. 10A to 11C show a more detailed, and often preferred method of creating the vehicular sensor waveform.
Figure 10B:
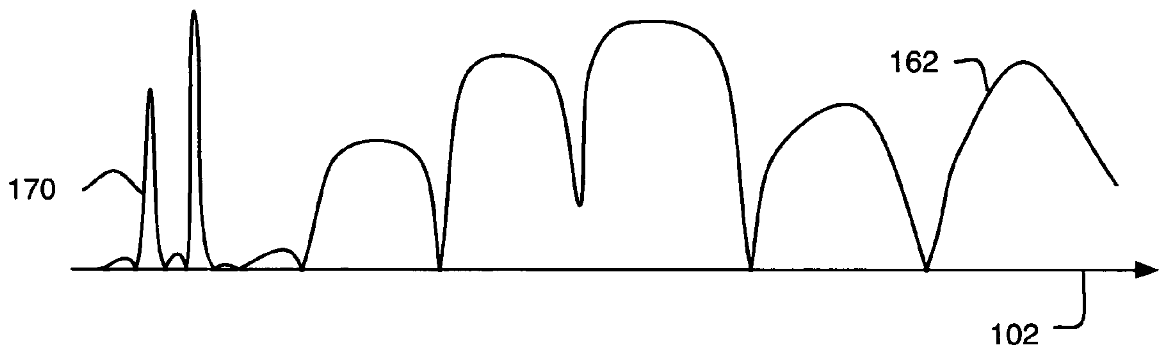
Figure 10C:
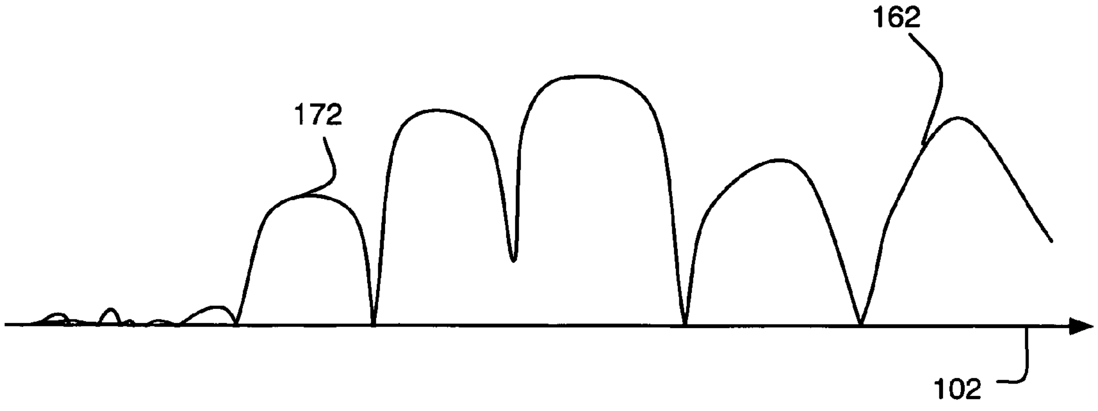
Figure 11A:
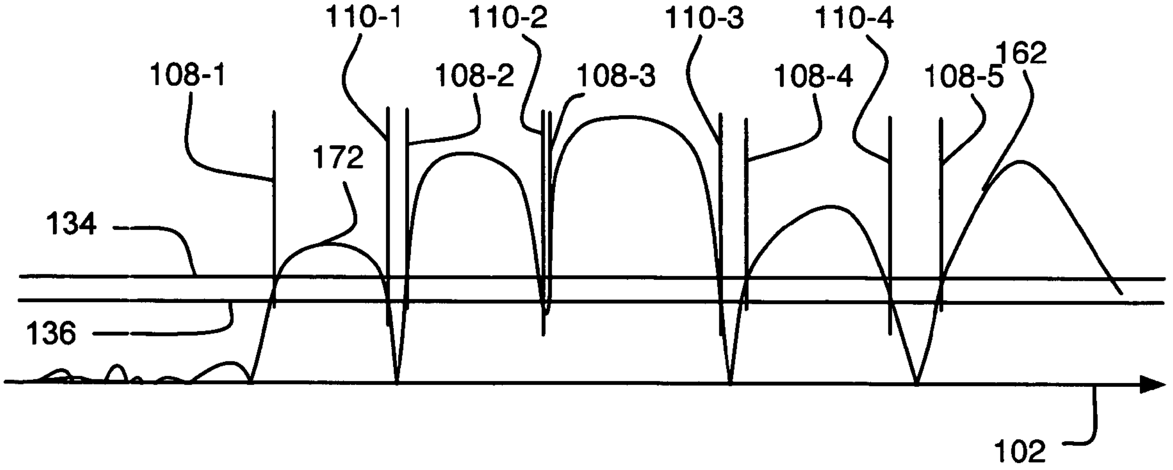
Figure 11B:
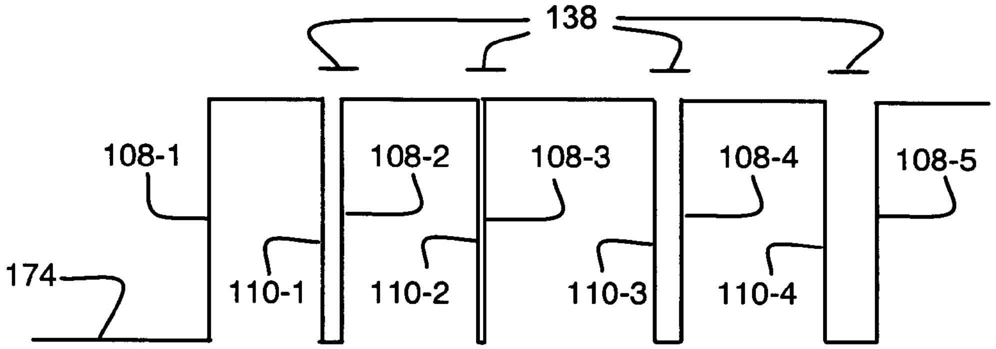
Figure 11C:
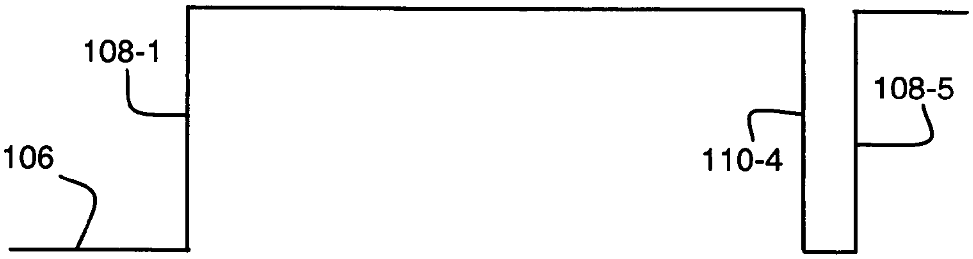

Often, the vehicle sensor state 104, when collected over time 102, is more chaotic, as shown in FIG. 10A. There may be an isolated spike 160, or more than one, as shown by the second isolated spike 160-2. As used herein, an isolated spike will refer to one of a small number of vehicle sensor states, that are large, and surrounded in time by small values of the vehicle sensor state. The small number is shown as one value the isolated spike 160, and two values in the second isolated spike 160-2. In certain embodiments, the small number may be as large as three to five.

The vehicle sensor state 104 may vary quickly in sign, even while one vehicle is passing near the vehicular sensor 2. Also confusing the picture, a second vehicle passing soon after the first vehicle may quickly stimulate the vehicular sensor 2 a second time 162.

The invention includes a method of conditioning the vehicle sensor state 104, collected over time by the following operations. Rectifying the vehicle sensor state 104 of FIG. 10A creates the rectified vehicle sensor state 170 of FIG. 10B. Smoothing an isolated spike 160 in the rectified vehicle sensor state creates the smoothed vehicle sensor state 172 of FIG. 11A. Designating rising edges and falling edges of the smoothed vehicle sensor state 172 based upon the up-threshold 134 and the down-threshold 136 of FIG. 4 creates the truncated vehicle sensor state 174 of FIG. 11B. And removing falling-rising transitions smaller than the holdover-interval 138 in the truncated vehicle sensor state 174 creates a preferred embodiment of the vehicular sensor waveform 106 shown in FIG. 11C.

This method of signal conditioning may or may not use additional memory to perform its operations. It removes false positives caused by the isolated spike 160. It also removes false positives caused by the vehicle sensor state 104 varying in sign while one vehicle passes near the vehicular sensor 2.

The up-threshold 134 is often preferred to be larger than the down-threshold 136. The up-threshold is preferred to be about 40 milli-gauss. The down-threshold is preferred to be about 22 milli-gauss. These values for the up-threshold and the down-threshold are typical for North America, and may be calibrated differently elsewhere. The holdover-interval 138 is often preferred between 10 milliseconds (ms) and 300 ms. The units of the up-threshold and down-threshold are in the units of the vehicular sensor 2. The units of the holdover-interval are preferably in terms of time steps of a time division multiplexing scheme controlled by synchronization with the access point 1500 preferably acting to synchronize each wireless vehicular sensor node 500 in the wireless vehicular sensor network 1600. Often these units may be preferred to be in terms of 1/1024 of a second, or roughly 1 ms.

Figure 3:
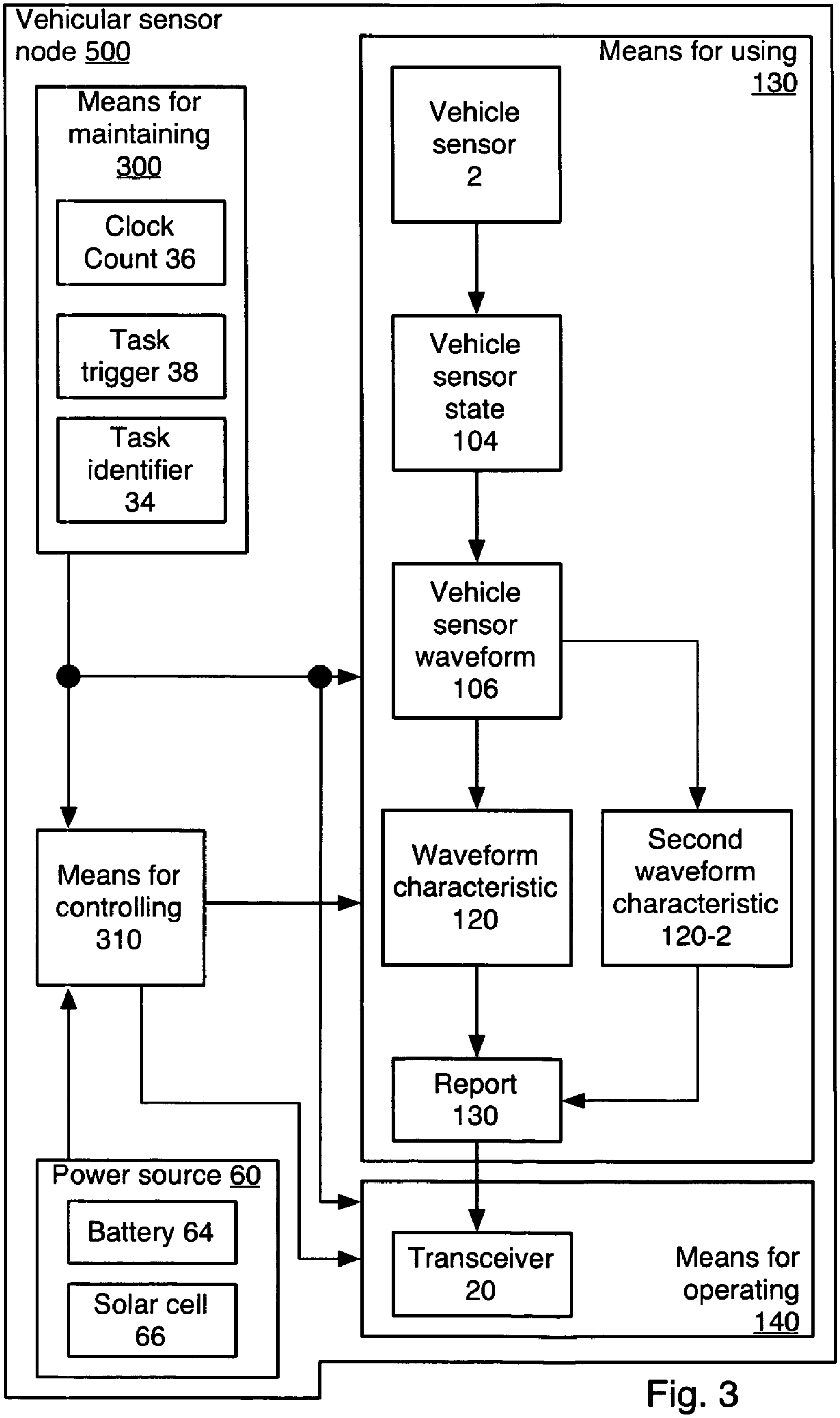
FIG. 3 shows a refinement of the wireless vehicular sensor node of FIG. 2.
Figure 4:
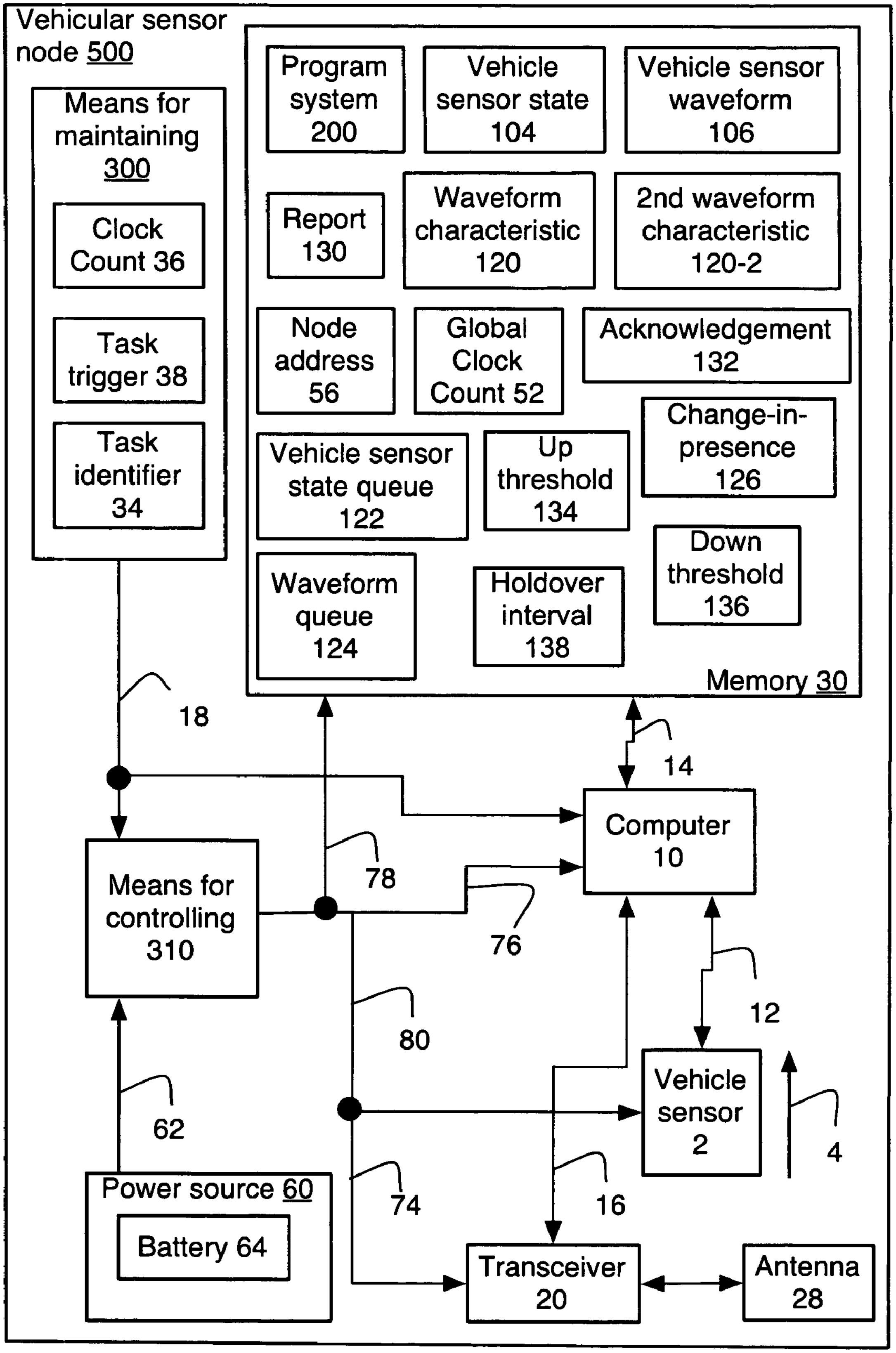
FIG. 4 shows an embodiment of the wireless vehicular sensor node of FIGS. 2 and 3 using a computer.
Figure 5:
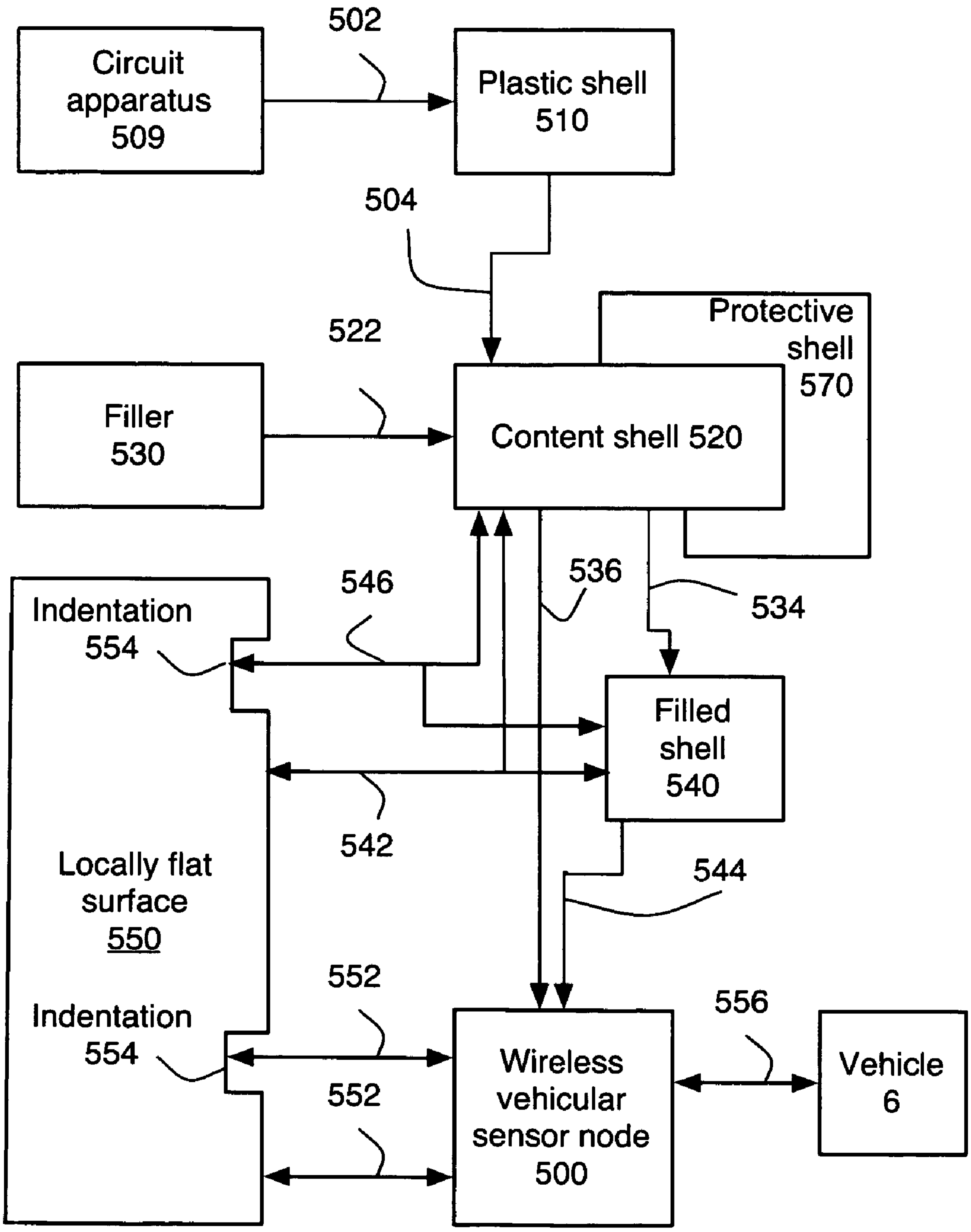
FIG. 5 shows making of the wireless vehicular sensor node from a circuit apparatus embodying the circuitry shown in the wireless sensor node of the previous Figures, attaching it to a locally flat surface, preferably pavement.

FIGS. 2 to 6B show various examples of embodiments of the wireless vehicular sensor node 500 and the access point 1500 included a wireless vehicular sensor network 1600, as well as the installation of the wireless vehicular sensor node in FIG. 5.

FIGS. 2 and 3 show the wireless vehicular sensor node 500 including the following. Means for using 100 a vehicle sensor state 104 from a vehicular sensor 2 to create a vehicular sensor waveform 106 based upon the presence of the vehicle 6. And means for operating 140 a transmitter 22 to send the report 130 across at least one wireless physical transport 1510 to the access point 1500 included the wireless vehicular sensor network 1600, to approximate the vehicular sensor waveform 106 at the access point. The report may be sent directly to the access point 1500, or via an intermediate node 580. The intermediate node may act as a repeater and/or signal converter, and may or may not function as a vehicular sensor node. The report may be generated by the means for using 100 in certain embodiments of the invention.

FIG. 3 shows the wireless vehicular sensor node 500 of FIG. 2 further including the following. Means for maintaining 300 a clock count 36, a task trigger 38, and a task identifier 34. Means for controlling 310 a power source 60, may preferably distribute electrical power to the means for using 100 and the means for operating 140, based upon the task trigger and the task identifier. The means for using may be provided operating power, when the vehicular sensor 2 is used to create the vehicular sensor waveform and/or to create its waveform characteristic 120 and/or its second waveform characteristic 120-2. These may then be preferably used to generate the report 130. The means for operating 140 may be provided operating power, when the report is to be sent to the access point 1500 across at least one wireless physical transport 1510, either directly, or via the intermediate node 580.

The wireless vehicular sensor node 500 may further preferably include: means for maintaining the clock count to create the task trigger and the task identifier. The means for operating 140 the transceiver 20 and means for using 100 are directed by the task identifier 34, when the task trigger 38 is active.

One or more computers, field programmable logic devices, and/or finite state machines may be included to implement these means.

FIG. 4 shows an alternative, often-preferred refinement, of the wireless vehicular sensor node 500 of FIGS. 2 and 3. The means for controlling 310 the power source 60 provides a computer power 76 to a computer 10, a memory power 78 to a memory 30 accessibly coupled 14 to the computer. The means for controlling also provides a vehicle sensor power 80 to the vehicular sensor 2 and a transceiver power 74 to the transceiver 20, which preferably includes the transmitter 22 of FIGS. 2 and 3. The computer 10 is first communicatively coupled 12 to the vehicular sensor 2, and is second communicatively coupled 16 to the transceiver. In certain further preferred embodiments, the computer and a clock timer implementing the means for maintaining 300 may be housed in a single integrated circuit. In certain embodiments, the means for maintaining may be referred to as a clock timer.

Some of the following figures show flowcharts of at least one method of the invention, which may include arrows with reference numbers. These arrows signify a flow of control, and sometimes data, supporting various implementations of the method. These include at least one the following: a program operation, or program thread, executing upon a computer; an inferential link in an inferential engine; a state transition in a finite state machine; and/or a dominant learned response within a neural network.

The operation of starting a flowchart refers to at least one of the following. Entering a subroutine or a macro instruction sequence in a computer. Entering into a deeper node of an inferential graph. Directing a state transition in a finite state machine, possibly while pushing a return state. And triggering a collection of neurons in a neural network. The operation of starting a flowchart is denoted by an oval with the word "Start" in it.

The operation of termination in a flowchart refers to at least one or more of the following. The completion of those operations, which may result in a subroutine return, traversal of a higher node in an inferential graph, popping of a previously stored state in a finite state machine, and return to dormancy of the firing neurons of the neural network. The operation of terminating a flowchart is denoted by an oval with the word "Exit" in it.

A computer as used herein will include, but is not limited to, an instruction processor. The instruction processor includes at least one instruction processing element and at least one data processing element. Each data processing element is controlled by at least one instruction processing element.

FIGS. 7A to 9A and 12 show aspects of the invention's method of responding to the presence of a motor vehicle in terms of the program system 200 of FIG. 4.

Figure 7A:
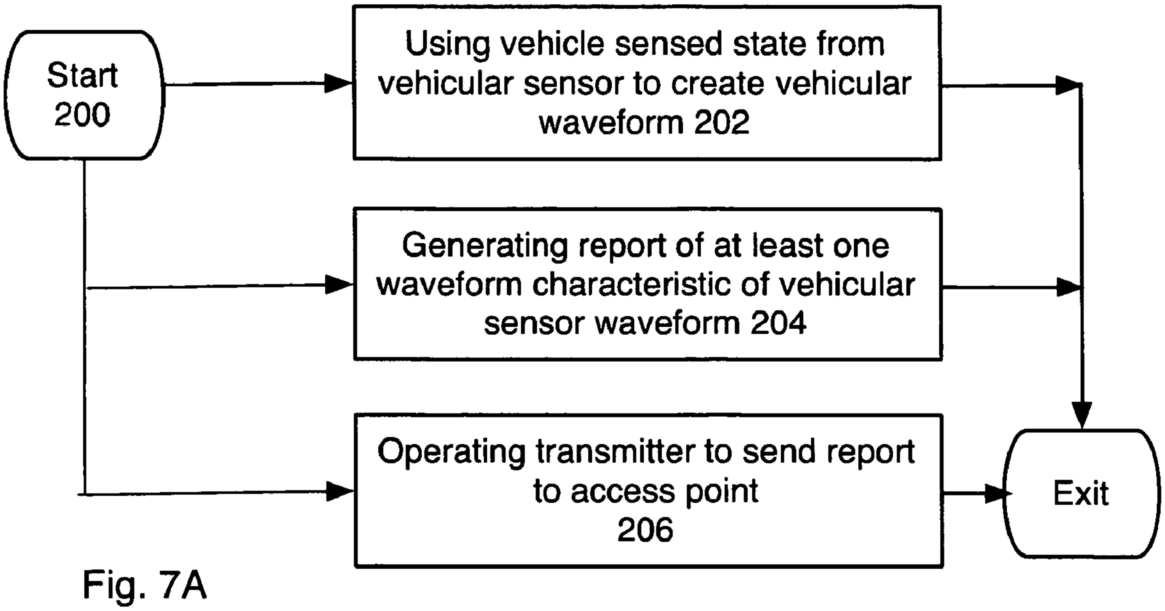

The program system 200 of FIG. 4 includes the program steps shown in FIG. 7A: Operation 202 supports using a vehicle sensor state 104 from a vehicular sensor 2 to create a vehicular sensor waveform 106 based upon the presence of the vehicle 6. Operation 204 supports generating a report 130 of at least one waveform characteristic 120 of the vehicular sensor waveform 106. Operation 206 supports operating a transmitter 22 to send the report 130 across at least one wireless physical transport 1510 to an access point 1500 included the wireless vehicular sensor network 1600, to approximate the vehicular sensor waveform at the access point.

Figure 7B:
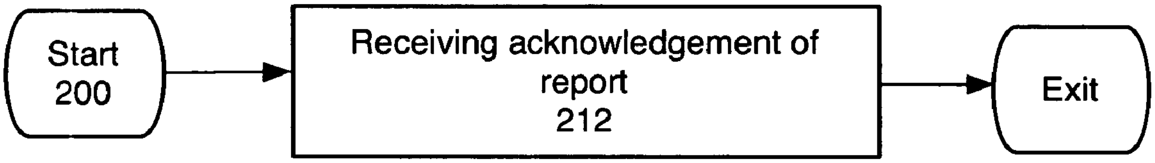
Figure 7C:
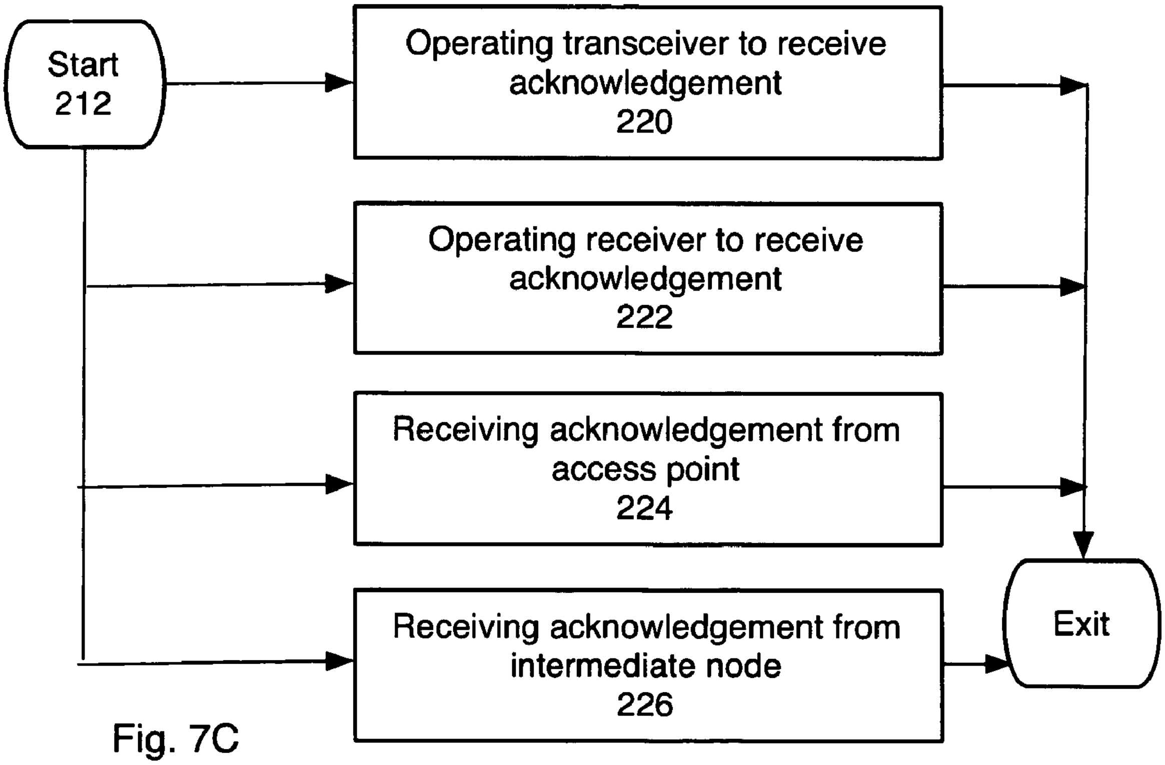

The program system 200 of FIGS. 4 and 7A may further support operation 212 receiving an acknowledgement 132 of the report 130 in FIG. 7B. The operation 212 of FIG. 7B may further include at least one of the following operations of FIG. 7C. Operation 220 supports operating the transceiver 20 to receive the acknowledgement 132. Operation 222 supports operating a receiver to receive the acknowledgement. Operation 224 supports receiving the acknowledgement from the access point 1500. Operation 226 supports receiving the acknowledgement from the intermediate node 580.

Figure 8A:
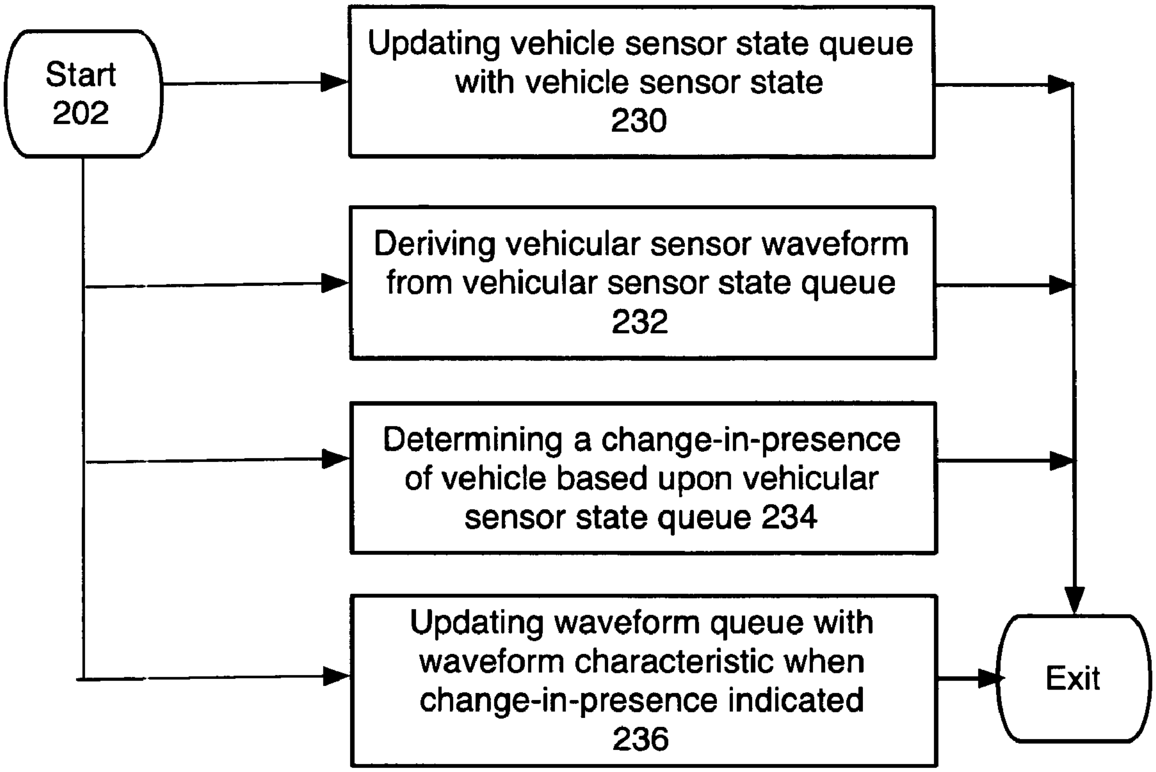

The operation 202 of FIG. 7A, using the vehicle sensor state 104, may further include the operations of FIG. 8A. Operation 230 supports updating a vehicle sensor state queue 122 with the vehicle sensor state. Operation 232 supports deriving the vehicular sensor waveform 106 from the vehicle sensor state queue. Operation 234 supports determining a change-in-presence 126 of the vehicle 6 based upon the vehicular sensor waveform. Operation 236 supports to updating a waveform queue 124 with the at least one waveform characteristic of the vehicular sensor waveform, when the change-in-presence is indicated.

By way of example, suppose a vehicle 6 approaches the wireless vehicular sensor node 500. The vehicular sensor state 104 is used to update the vehicle sensor state queue 122, as supported by operation 230 of FIG. 8A. The vehicular sensor waveform 106 is derived from the vehicle sensor state queue, as supported by operation 232 and discussed regarding FIGS. 1A to 1C, and 10A to 11C. A change-in-presence 126 of the vehicle is determined based the vehicular sensor waveform, as supported by operation 234. Usually this would be determined by a rising edge 108 in the vehicular sensor waveform. The waveform queue 124 is updated with a waveform characteristic 120, when the change-in-presence is indicated. Preferably, this waveform characteristic would indicate the rising edge.

To continue the example, suppose the vehicle 6 moves away from wireless vehicular sensor node 500 at a later time. The operations of FIG. 8A would support using the vehicle sensor state 104 in much the same way. The change-in-presence 126 of the vehicle is determined based the vehicular sensor waveform 106, as supported by operation 234, and would preferably be determined by a falling edge 110 in the vehicular sensor waveform. The waveform queue 124 is updated with a waveform characteristic 120, when the change-in-presence is indicated. Preferably, this waveform characteristic would indicate the falling edge.

Figure 8B:
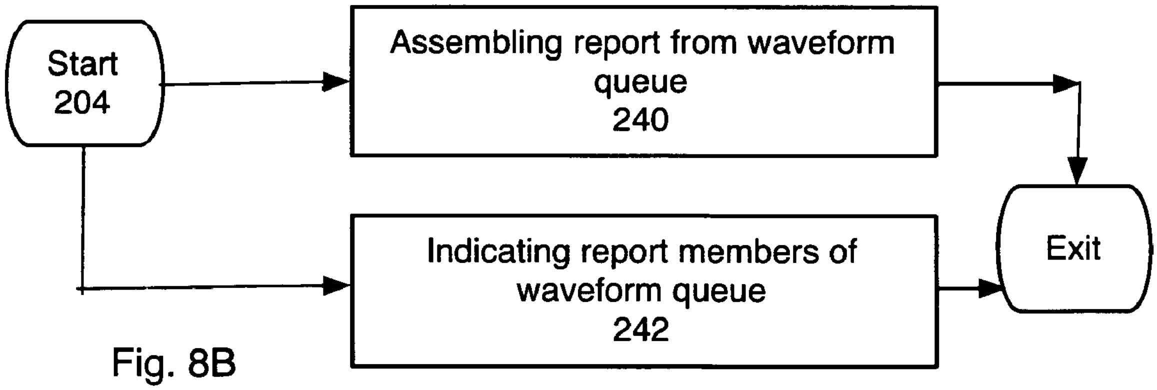

The operation 204 of FIG. 7A, generating the report 130, may further include the operations of FIG. 8B. Operation 240 supports assembling the report from the waveform queue 124. Operation 242 supports indicating report members of the waveform queue.

Figure 8C:
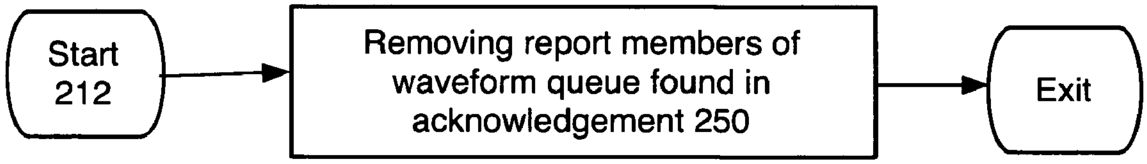

The operation 212 of FIG. 7B, receiving the acknowledgement 132, may further include the operation of FIG. 8C. Operation 250 supports removing report members of the waveform queue 124 found in the acknowledgement.

Figure 9A:
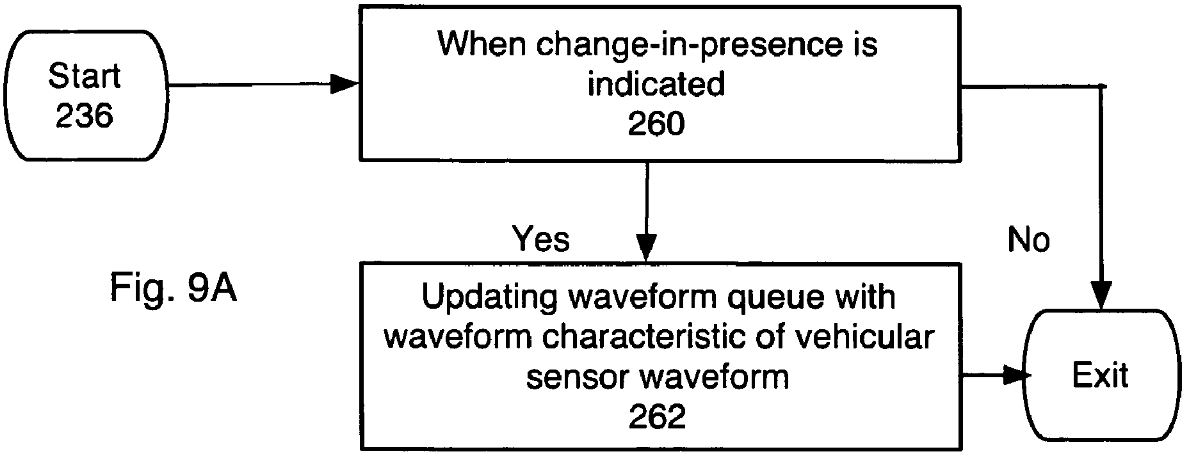
Figure 9B:
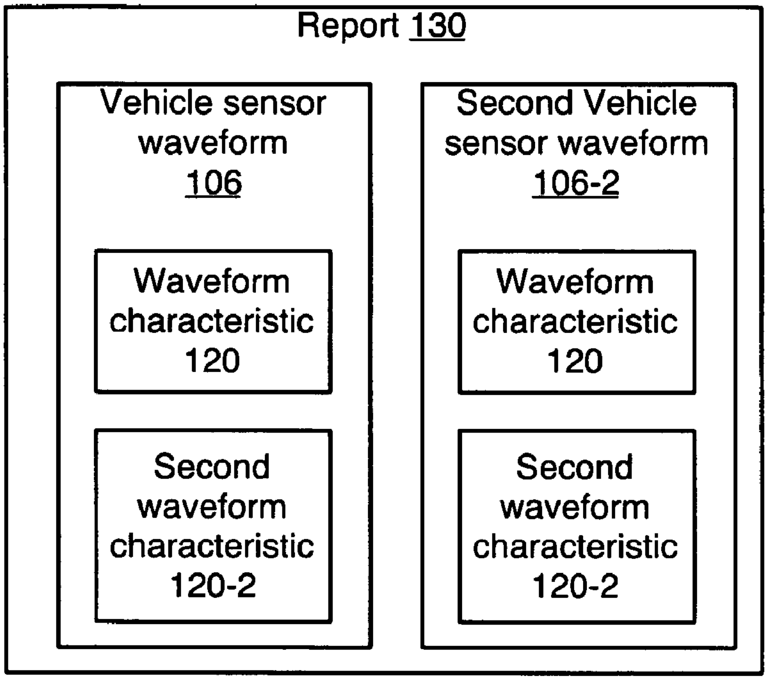
FIG. 9B shows some details of an example of the report.
Figure 9C:
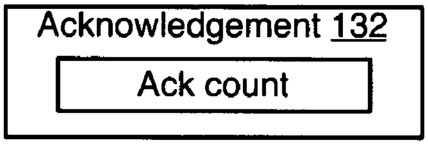
FIG. 9C shows some details of the acknowledgement.

The operation 236 of FIG. 8A may include the operations of FIG. 9A. Operation 260 supports determining when the change-in-presence 126 is indicated. When this is "No", the operations of this flowchart terminate. When "Yes", the operation 262 supports update the waveform queue 124 with at least one waveform characteristic 120 of the vehicular sensor waveform 106.

Figure 12A:
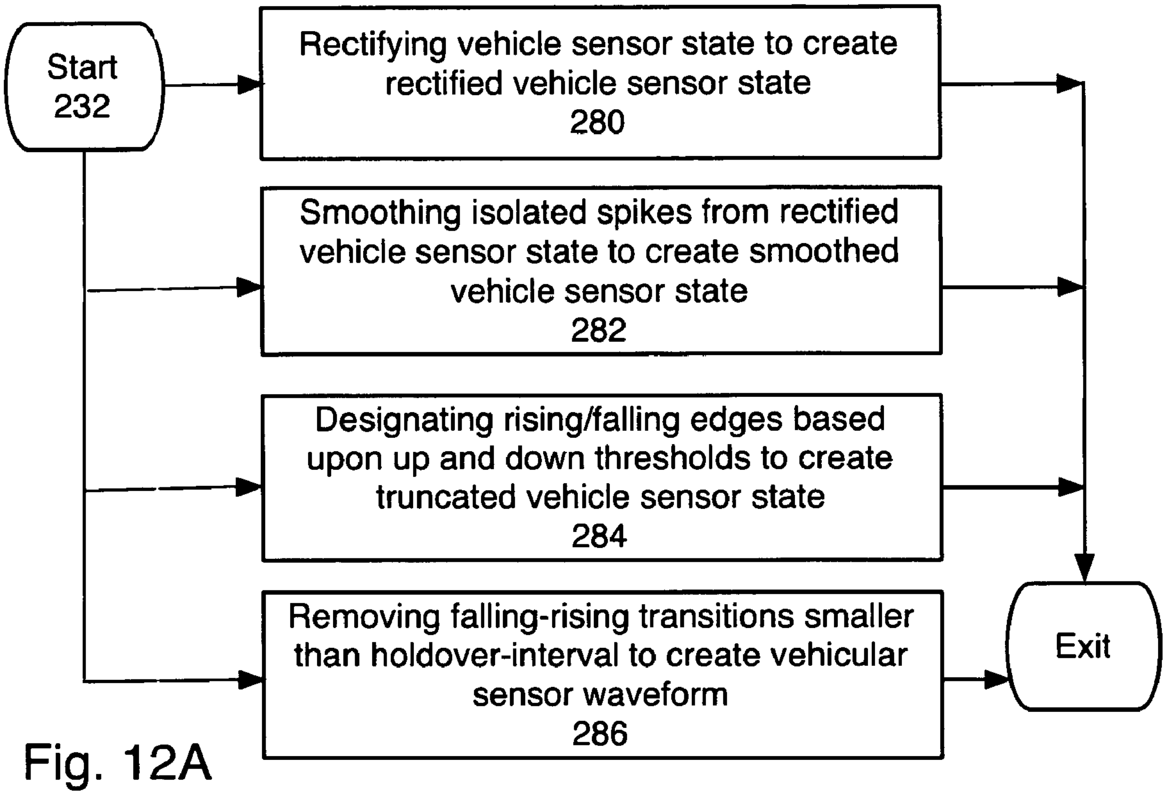
FIG. 12A shows further details of the program system of FIG. 4, and 7A to 9A.

The operation 232 of FIG. 7A, using the vehicle sensor state 104 to create the vehicular sensor waveform 106, may include the operations of FIG. 12. Operation 280 supports rectifying the vehicle sensor state 104 of FIG. 10A creates the rectified vehicle sensor state 170 of FIG. 10B. Operation 282 supports smoothing at least one isolated spike 160 from the rectified vehicle sensor state to create the smoothed vehicle sensor state 172 of FIG. 10C. Operation 284 supports designating rising edges and falling edges of the smoothed vehicle sensor state 172 based upon the up-threshold 134 and the down-threshold 136 of FIG. 4 to create the truncated vehicle sensor state 174 of FIG. 11B. Operation 286 supports removing falling-rising transitions smaller than the holdover-interval 138 in the truncated vehicle sensor state 174 creates a preferred embodiment of the vehicular sensor waveform 106 shown in FIG. 11C.

The wireless vehicular sensor node 500 includes a vehicular sensor 2, which preferably includes a magnetic sensor, preferably having a primary sensing axis 4 for sensing the presence of a vehicle 6, as shown in FIG. 6B, and used to create the vehicle sensor state 32. It is often preferred that the vehicular sensor is the magnetic sensor. The magnetic sensor may preferably employ a magneto-resistive effect. The vehicular sensor 2 of FIG. 2 to FIG. 4, preferably uses a form of the magnetic resistive effect, preferably includes a more than one axis magneto-resistive sensor to create a vehicle sensor state.

The vehicular sensor may include a two axis magneto-resistive sensor. A two axis magneto-resistive sensor may be used to create the vehicle sensor state as follows. The X-axis may be used to determine motion in the primary sensor axis 4. The Z-axis may be used to determine the presence or absence of a vehicle 6.

The vehicular sensor may further preferably include a three axis magneto-resistive sensor.

A three axis magneto-resistive sensor may be used to create the vehicle sensor state as follows. The X-axis may also be used to determine motion in a primary sensor axis 4. The Y-axis and Z-axis may be used to determine the presence or absence of a vehicle 6. In certain embodiments, the Euclidean distance in the Y-Z plane is compared to a threshold value, if greater, then the vehicle is present, otherwise, absent.

The vehicular sensor may preferably include one of the magneto-resistive sensors manufactured by Honeywell.

Transmitting the report uses at least one wireless physical transport. The wireless physical transport may include any of an ultrasonic physical transport, a radio-frequency physical transport, and/or an infrared physical transport.

Transmitting the report may be spread across a frequency band of the wireless physical transport. More particularly, the transmitting the report of the vehicular sensor waveform may include a chirp and/or a spread spectrum burst across the frequency band.

The transmitter 22 of FIGS. 2 and 3, and the transceiver 20 of FIG. 4 may communicate across a wireless physical transport 1510, which may include any combination of an ultrasonic physical transport, a radio physical transport, and an infrared physical transport. Different embodiments of the wireless vehicular sensor node 500 may use difference combinations of these transmitters and/or transceivers. Where useful, the wireless vehicular sensor node includes an antenna 28 coupling with the transceiver 20 as shown, or to a transmitter, which is not shown. The antenna may preferably be a patch antenna.

The report 120 of the vehicular sensor waveform106 may further identify the wireless vehicular sensor node 500 originating the report.

Transmitting the report of the vehicular sensor waveform may initiate a response across the wireless physical transport, preferably from an access point. The response may be an acknowledgement of receiving the report.

FIG. 9B shows some details of an example of the report 130 generated and sent by the wireless vehicular sensor node. The report may include at least one waveform characteristic 120 of at least one vehicular sensor waveform 106 indicating a change in the presence of a vehicle 6 passing near the vehicular sensor node 500. In certain embodiments, multiple waveform characteristics may be included in the report for at least one vehicular sensor waveform. Multiple vehicular sensor waveforms may be included in the report, each with at least one waveform characteristic. More than one vehicular sensor waveforms included in the report may include more than one waveform characteristic.

Consider the following example of a wireless vehicular sensor network 1600 including an access point 1500 and multiple wireless vehicular sensor nodes as shown in FIG. 6B. One preferred embodiment of this network includes using a synchronous time division multiple access protocol based upon the IEEE 802.15.4 communications protocol. The access point transmits a synchronization message, which is received by the wireless vehicular sensor nodes, and permits them to synchronize on a system clock. Preferably, a wireless vehicular sensor node 500 includes a means for maintaining 300 a clock count 36, task trigger 38, and task identifier 34, as shown in FIGS. 3 and 4.

By way of example, the time division multiple access protocol may synchronize the wireless vehicular sensor network 1600 to operate based upon a frame with a frame time period. The frame time period may preferably approximate at least one second. The time division multiple access protocol may operate in terms of time slots with a time slot period. The time slot period may be preferred to be a fraction of the frame time period. The fraction may preferably be a power of two. The power of two may preferably be one over 1K, which refers to the number 1,024. The time slot period then approximates a millisecond. The wireless vehicular sensor network may further organize the report 130 in terms of a meta-frame, which may preferably have a meta-frame time period as a multiple of the frame time period. The meta-frame time period may preferably be thirty times the frame time period, representing a half of a minute.

Figure 12B:
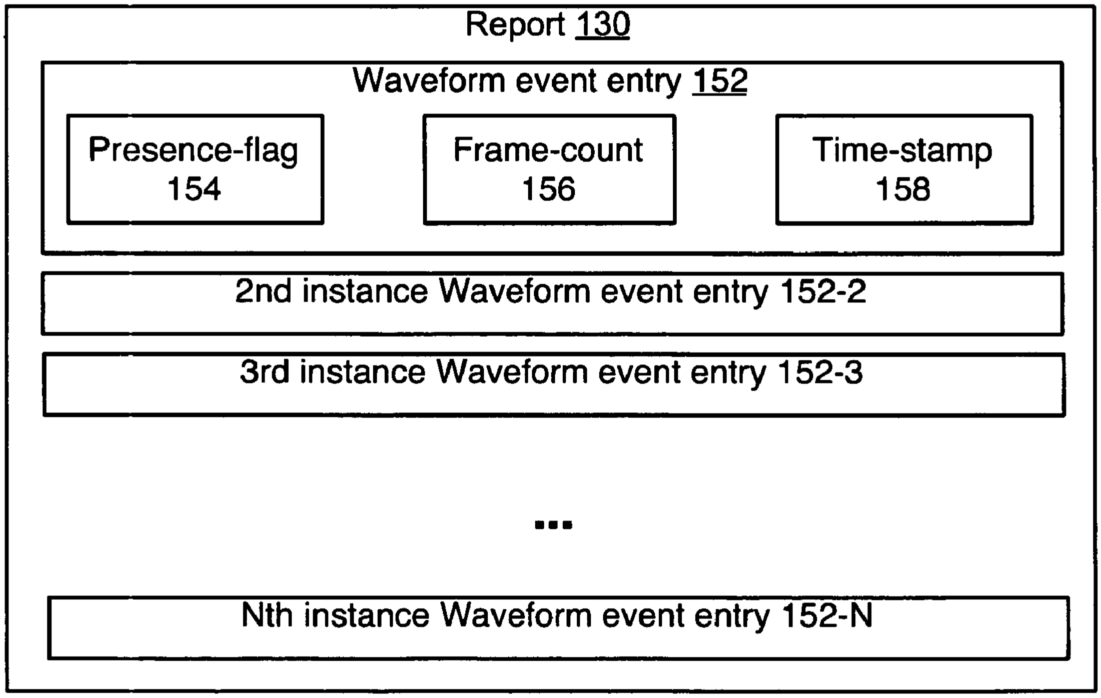
FIG. 12B shows further details of an example of the report.

The report 130 may preferably include a waveform event list 150 for the waveform characteristics observed by the wireless vehicular sensor node 500 during the current and/or most recent meta-frame as shown in FIG. 12B. A waveform characteristic 120 may be represented in the waveform event list by a waveform event entry 152 including the following. A presence-flag 154 indicating the presence or absence of the vehicle 6. A frame-count 156 indicating the frame in the meta-frame, and a time-stamp 158 indicating the time slot within that frame in which the waveform characteristic occurred.

The waveform event list 150 may include a fixed number N of instances of the waveform event entry 152, to minimize computing and power consumption at the wireless vehicular sensor node 500. The fixed number N may be a power of two, such as 32 or 64.

The presence-flag 154 may represent a vehicle 6 being present with the binary value '1', and the absence of the vehicle with a '0'. Alternatively, '0' may represent the presence of the vehicle. And its absence by '1'.

The frame-count 156 may be represented in a five bit field. The time-stamp 158 may be represented in a ten bit field.

The waveform event entry may be considered as a fixed point number, preferably 16 bits. When the waveform event entry has one of the values of 0x7FFF or 0xFFFF, it represents a non-event, no additional waveform characteristic 120 has been determined by the wireless vehicular sensor node.

In certain applications, such as sensing a vehicle 6 in parking slots within parking structures, the frame time period may preferably approximate multiple seconds, such as eight seconds. The meta-frame time period may be sixty times the frame time period, representing four minutes. The time slot period may be the frame time period divided by 1K, approximating one hundredth of a second.

The waveform event entry 152 may preferably include at least the presence-flag 154. In certain embodiments, this may be the only field in the waveform event entry.

The waveform event entry may further include the frame-count 156.

Finally, the waveform event entry may further include the time-stamp 158.

FIG. 9C shows some details of the acknowledgement 132 of the report 130 of FIGS. 4, 6A, 7B, 8C and 12B. The acknowledgement of the report may preferably include a count of the waveform characteristics 120 being acknowledged. Because the waveform characteristics are sequential in time, knowing how many are being acknowledged is all that is typically needed to know exactly which ones are acknowledged.

The wireless physical transport may also be used to send synchronization signal to the wireless vehicular sensor nodes. The wireless vehicular sensor nodes may each maintain a local clock, synchronized by the clock synchronization sent across the wireless physical transport.

The report of the vehicular sensor waveform may be encoded in a packet format, which is modulated and frequency converted. More than one vehicular sensor waveforms may be encoded into one packet. The packets may be transmitted using a wireless communication protocol over the wireless physical transport. The acknowledgement and/or the synchronization message may be encoded in a packet.

Figure 6A:
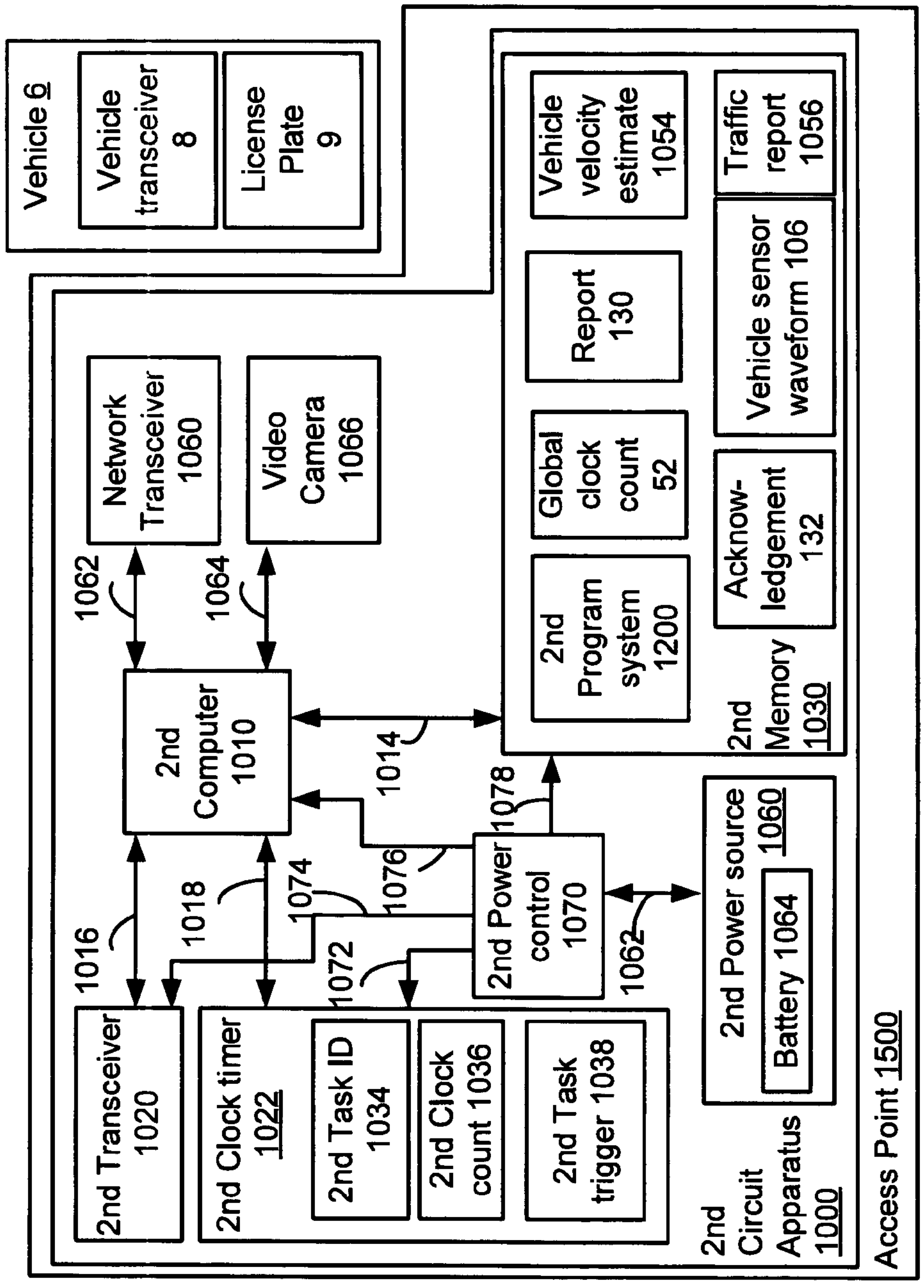
FIG. 6A shows an access point for communicating with at least one of the wireless vehicular sensor nodes of the preceding Figures.
Figure 6B:
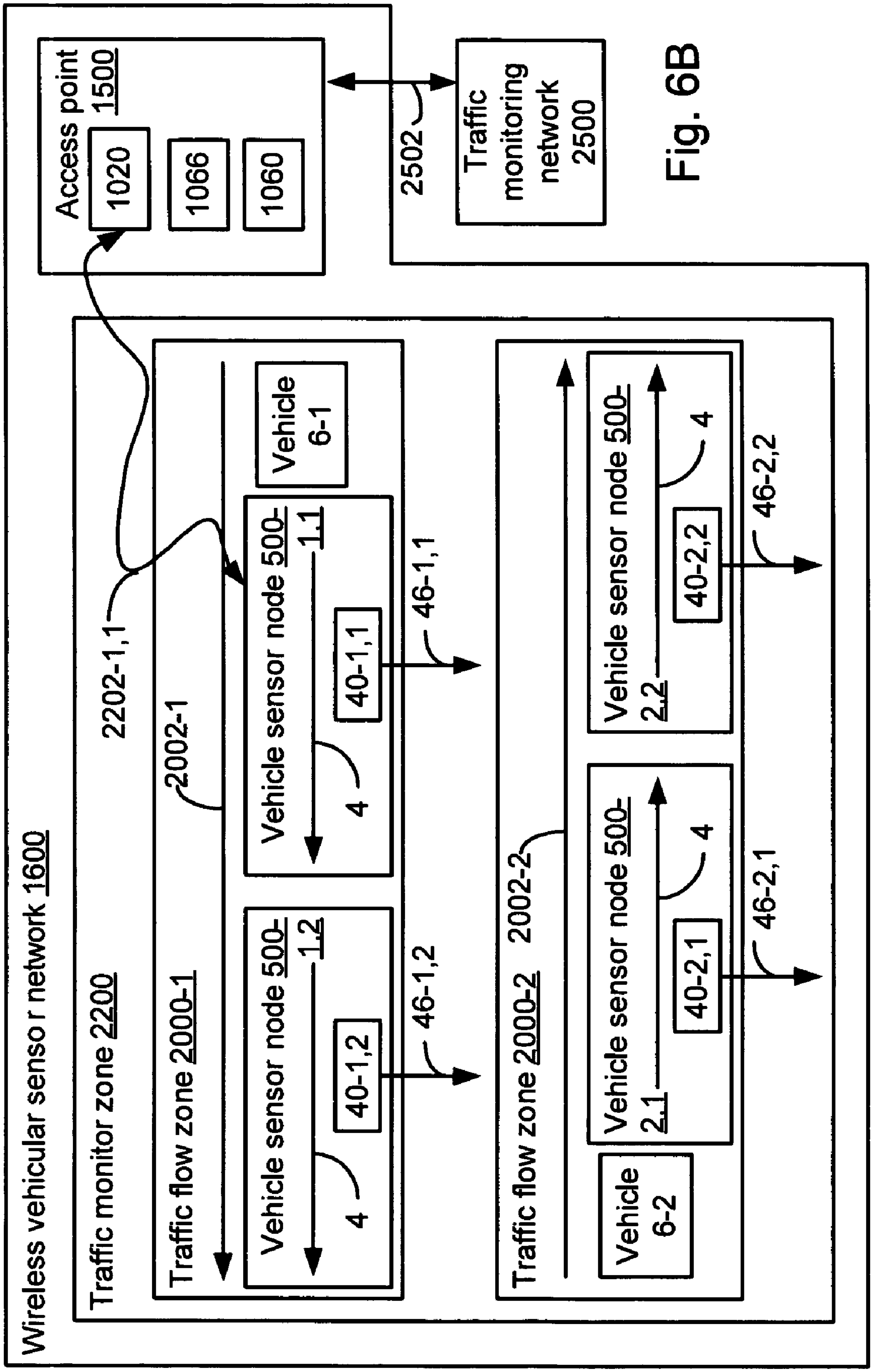
FIG. 6B shows a wireless vehicular sensor network using the access point and vehicular sensors shown in the preceding Figures.

The transmitting of the report 130 of the vehicular sensor waveform 106 may preferably create a received report 130 from the wireless vehicular sensor node 500, which may preferably be received by an access point 1500 in a wireless vehicular sensor network 1600 as shown in FIG. 6A. The wireless vehicular sensor network may include more than one access point. The wireless vehicular sensor network may include a sensor report analyzer creating any of a vehicular traffic report, a vehicular parking report, and/or a vehicular speeding report, based upon the received vehicular sensor waveform report. The sensor report analyzer may be implemented in an access point. Alternatively, the sensor report analyzer may receive the received vehicular sensor waveform report from the access point. The received vehicular sensor waveform report may further include an indication of the wireless vehicular sensor node at which the vehicular sensor waveform originated.

The means for controlling 310 the power may preferably minimize delivery of power to preferably all circuitry when the task trigger is inactive or the task identifier does not indicate the need for the circuitry. The circuitry includes the transmitter 22 and/or transceiver 20, the vehicular sensor 2, the computer 10, as well as other circuits, such as memory 30. The power consumption of the minimized circuitry may preferably be less than 150 microwatts (μw). The means for maintaining 300 the clock count 36 may be powered most of the time. The means for maintaining may couple with a clock crystal. The clock crystal may preferably operate at approximately 32K Hertz (Hz), where 1K is 1024.

At least two of the means for maintaining 300, the means for controlling 310, the means for using 100 and the means for operating 140 may preferably be housed in a single integrated circuit. Preferably, all of these means may be housed in the single integrated circuit. Also, the single integrated circuit may house the transmitter 22 and/or the transceiver 20 and/or the vehicular sensor 2.

The power source 60, may preferably include at least one battery 64, and may further preferably include at least one solar cell 66.

The transmitter 22 and/or the transceiver 20 preferably implement a version of at least one wireless communications protocol, preferably the IEEE 802.15.4 communications standard. It uses at least one channel of the wireless communication protocol. It may use a second channel to communicate with a vehicle transceiver 8 associated attached to the vehicle 6, as shown in FIG. 6A.

The invention may preferably include a circuit apparatus 509 shown in FIG. 5, embodying the electronics of the wireless vehicular sensor node 500 as shown in FIGS. 2 to 4.

The transceiver 20 preferably implements a version of at least one wireless communications protocol, preferably the IEEE 802.15.4 communications standard. It uses at least one channel of the wireless communication protocol. It may use a second channel to communicate with a vehicle radio transceiver associated attached to the vehicle.

The transceiver 20 may include a receiver and a transmitter.

Operating the radio transceiver often refers to operating exactly one of the receiver and the transmitter. It may be preferred that when the receiver is being operated, power delivery to the transmitter is minimized. Similarly, when the transmitter is operated, power delivery to the receiver is minimized.

The wireless vehicular sensor node 500 may further include a light emitting structure, which is not shown, used to visibly communicate during installation and/or testing a vehicular sensor network. It may also include a second light emitting structure used to communicate with vehicle operators.

The wireless vehicular sensor node 500 may further include the following. The computer 10 controllably coupled 42 with a light emitting structure visibly arranged perpendicular to the primary sensing axis 4. The program system 200 may further perform the operation of when the task identifier 34 indicates a feedback task using the light emitting structure to visibly communicate.

Using the light emitting structure to visibly communicate preferably includes receiving from the transceiver 20 a probe node address, and visibly communicating using the probe node address. The wireless vehicular sensor node 500 preferably further includes a node address 56. Visibly communicating using the probe node address further includes visibly communicating when the node address equals the probe node address.

Alternatively, visibly communicating using the probe node address 54 may further includes at least one the following: Visibly communicating when the node address 56 does not equal the probe node address 54; Visibly communicating when the node address is less than the probe node address; and Visibly communicating when the node address is greater than the probe node address.

The invention includes an internal power system in the wireless vehicular sensor node 500. The power source 60 preferably includes at least one battery 64. The power source 60 may further preferably include at lease one solar cell.

The wireless vehicular sensor node 500, where the transceiver 20 may include a receiver and a transmitter. The power control operations when the transceiver power trigger is asserted, the transceiver power is set to operate the radio transceiver may further preferably include: When the transceiver-receive power trigger is asserted, the transceiver power is set to operate the receiver. When the transceiver-transmit power trigger is asserted, the transceiver power is set to operate the transmitter.

In certain preferred embodiments of the wireless vehicular sensor node 500, the radio transceiver may use a second of the channels of the wireless communication protocol to communicate with a vehicle radio transceiver 8 associated with the vehicle 6 as shown in FIG. 6A.

The invention includes a method of making a wireless vehicular sensor node 500 from the circuit apparatus 509 and from a plastic shell 510 as shown in FIG. 5, including the steps of: Inserting 502 the circuit apparatus into the plastic shell to content-create 504 a content shell 520. There are several additional steps resulting in the wireless vehicular sensor node.

Gluing 546 the content shell 520 to an indentation 554 in the locally flat surface 550 to create 536 the wireless vehicular sensor node 500 glue-bonded 552 to the indentation.

Gluing 542 a protective shell 570 containing the content shell 520 to the locally flat surface to create 536 the wireless vehicular sensor node 500 glue-bonded 552 to the locally flat surface.

Filling 522 the content shell 520 with a filler 530 to fill-create 534 a filled shell 540. Gluing 542 the filled shell 540 to a locally flat surface 550 to glue-create 544 the wireless vehicular sensor node 500 with a glued bond 552 to the locally flat surface 550.

Alternatively, the filled shell may be glued 546 to an indentation 554 in the locally flat surface to create the wireless vehicular sensor node with a glued bond to the indentation in the locally flat surface.

In many situations, the locally flat surface is the pavement, however one skilled in the art will recognize that locally flat surfaces may include, but are not limited to, a pavement, a ramp, a wall, a ceiling, a traffic barrier, and a fence, by way of example.

The plastic shell 510 may resiliently deform while preserving the glued bond 552 when the vehicle 6 rests 556 on the plastic shell 510. The vehicle may further rest on the plastic shell for more than a day, an hour, a minute, and/or a second.

The plastic shell 510 preferably includes a polycarbonate compound, preferably a high impact polycarbonate compound. The plastic shell may further preferably be made from a Bayer high impact polycarbonate compound. The plastic shell may further preferably be a version of the SMARTSTUD™ plastic shell manufactured by Harding Systems as described at http://www.hardingsystems.com/

The protective shell 570 may include a ring of rigid material, often preferred to be metal, to provide side support in certain instances for the plastic shell 510.

The filler 530 preferably includes an elastomer, which further preferably includes a polyurethane elastomer.

The gluing 542 and/or 546 preferably use an adhesive, which preferably does not destructively interact with the plastic shell 510, and may further be manufactured by Harding Systems.

The invention includes a method of using the power source 60 of FIGS. 3 and 4 to internally power the wireless vehicular sensor node 500. It preferably includes: minimizing the power 62 from the power source 60 delivered to the transceiver 20 and the vehicular sensor 2, when the task trigger 38 is inactive. And distributing the power from the power source delivered to the radio transceiver and the vehicular sensor based upon the task identifier, when the task trigger is active.

Distributing the power 62 from the power source 60 preferably includes delivering the transceiver power 74 to the transceiver 20, when the task identifier 34 indicates that the radio transceiver is used. And delivering a sensor power 80 to the vehicular sensor 2, when the task identifier indicates the vehicular sensor is used.

The method of using the power source 60 may preferably further include providing a constant power 72 to the clock timer 22.

The method of using the power source 60 may preferably further include: providing the computer power 76 to the computer 10, when a task trigger 38 generated by the clock timer 22 is asserted, the computer power is set to operate the computer. It may be further preferred that when a power-down command is asserted in the task identifier 34, the computer power is set to standby mode for the computer.

The invention includes an access point 1500 for wireless communicating 2202 with at least one the wireless vehicular sensor node 500 as shown in FIGS. 6A and 6B. The access point preferably includes the following: A second clock timer 1022 second providing 1018 a second task identifier 1034, a second clock count 1036, and a second task trigger 1038 to the second computer 1010. The second computer second-accesses 1014 a second memory 1030 to execute program steps included in a second program system 1200. The second computer is second-second communicatively coupled 1016 with a second transceiver 1020. The second computer is third-communicatively coupled 1062 to a network transceiver 1060 for a network-coupling 2502 to a traffic monitoring network 2500.

The operations of the access point 1500 may be implemented by the second program system 1200, which may preferably include the following. When the second task identifier 1034 indicates distribute clock alignment, using the second clock count 1036 to create the global clock count 52, and using the second radio transceiver 1020 to send the global clock count to at least one wireless vehicular sensor node 500. When the second task identifier indicates access sensor state of the wireless vehicular sensor node, using the second radio transceiver to receive the report 130 from the wireless vehicular sensor node. When the second task identifier 1034 indicates calculate a vehicle velocity estimate 1054, calculating the vehicle velocity estimate based upon the received report 130. When the second task identifier 1034 indicates a traffic network update, generating a traffic report based upon the received report, and sending the traffic report using the network transceiver 1060 across the network-coupling 2502 to the traffic monitoring network 2500.

The invention includes installing the wireless vehicular sensor node 500 wireless communicating 2202 with an access point 1500, as shown in FIG. 6A, for a traffic monitoring zone 2200 as shown in FIG. 6B, including Aligning the primary sensing axis 4 of the wireless vehicular sensor node 500 with the primary traffic flow 2002 of at least one traffic flow zone 2000. And, testing the wireless vehicular sensor node 500 using the light emitting structure 40 to visually communicate 46 perpendicular to the primary traffic flow 2002.

The traffic flow zone 2000 may include more than one primary traffic flow 2002, often indicating two-way traffic. The traffic monitoring zone 2200 may include more than one traffic flow zone 2000.

The access point 1500 may wirelessly communicate with more than one wireless vehicular sensor node 500. By way of example, FIG. 6B shows the following: The traffic monitoring zone 2200 includes a first traffic flow zone 2000-1 and a second traffic flow zone 2000-2.

The first traffic flow zone 2000-1 includes a first primary traffic flow 2002-1. A first-first wireless vehicular sensor node 500-1,1 and a first-second wireless vehicular sensor node 500-1,2 are installed in the first traffic flow zone 2000-1. The primary sensing axis 4 of these wireless vehicular sensor nodes are aligned with the first primary traffic flow 2002-1.

The second traffic flow zone 2000-2 includes a second primary traffic flow 2002-2. A second-first wireless vehicular sensor node 500-2,1 and a second-second wireless vehicular sensor node 500-2,2 are installed in the second traffic flow zone. The primary sensing axis 4 of these wireless vehicular sensor nodes are aligned with the second primary traffic flow.

The access point 1500 may integrate the number of vehicles sensed by a collection of wireless vehicular sensor nodes to estimate availability of parking in a parking facility, or a region of the parking facility. The traffic report 1056 may include the estimated availability. The traffic monitoring network 2500 may present the estimated availability to a vehicle 6 trying to park. The vehicle may be operated by a human operator or directed by an automatic driving system.

When a first vehicle 6-1 travels in the first primary traffic flow 2002-1 of the first traffic flow zone 2000-1, the following operations are performed by the first-first wireless vehicular sensor node 500-1,1 and the first-second wireless vehicular sensor node 500-1,2 are installed in the first traffic flow zone 2000-1. Both of the wireless vehicular sensor nodes are time synchronized by the access point 1500 to within a fraction of a second, in particular, to within sixty microseconds. The vehicle sensor state 32 of the vehicular sensor 2 of each of the wireless vehicular sensor node 500 with the wireless vehicular sensor nodes is used to create a vehicle sensor state 50 within that wireless vehicular sensor node. The first-first wireless vehicular sensor node 500-1,1 sends its vehicle sensor state 50 to at least partly create the received vehicular sensor state 1050. The first-second wireless vehicular sensor node 500-1,2 sends its vehicle sensor state 50 to further at least partly create the received vehicular sensor state 1050.

It is often preferred that the received vehicular sensor state 1050 includes a time synchronized sensor state for each vehicular sensor in the wireless vehicular sensor nodes for the same traffic flow zone. One preferred method of determining a vehicle velocity estimate 1054 includes using at least two vehicle sensor nodes, such as the first-first wireless vehicular sensor node 500-1,1 and the first-second wireless vehicular sensor node 500-1,2 of FIG. 6B. These wireless vehicular sensor nodes are positioned a distance d apart. Each vehicular sensor 2 is synchronously used to determine the presence of the first vehicle 6-1. The time it takes for the first vehicle to travel from the first-first wireless vehicular sensor node 500-1,1 to the first-second wireless vehicular sensor node 500-1,2 is preferably known to a fraction of a second by the access point based upon at least one received report 130. The vehicle velocity estimate 1054 is the ratio of the distance d traveled divided by the time to travel.

The access point 1500 preferably includes a network transceiver 1060, which may have several preferred embodiments. The network transceiver 1060 may include only a network transmitter. Alternatively the network transceiver 1060 may include the network transmitter and a network receiver.

The traffic monitoring network 2500 may include a traffic control cabinet. The traffic control cabinet may include a NEMA traffic controller, a type 170 controller, or a type 2070 controller. The network transceiver 1060 may interface to a relay drive contact, through an opto-isolation circuit, or through an interface printed circuit board, which may support two relay drive contacts.

In FIG. 6B, the access point 1500 may receive the vehicle sensor state 50 of the four wireless vehicular sensor nodes. To drive a traffic light controlled through the traffic monitoring network 2500, the traffic control cabinet may preferably use two signals generated by the network transmitter of the access point to signal the presence of vehicles in each of the two traffic flow zones. The traffic flow zones may correspond to lanes on a roadway. The vehicle sensor state 50 of the first-first wireless vehicular sensor node 500-1,1 may be logically combined with the vehicle sensor state 50 of the first-second wireless vehicular sensor node 500-1,2 to create a single bit of the traffic report 1056. The traffic report may include one bit for the first traffic flow zone 2000-1 and one bit for the second traffic flow zone 2000-2. It may be preferred that a '1' signal the presence of a vehicle, and a '0' signal the presence of no vehicles. In such a situation, the logical combining of the vehicle states may preferably be preformed by a logical OR operation, which is readily implemented in the second computer 1010.

Alternatively, the traffic monitoring network 2500 may implement another embodiment of the network-coupling 2502. The network-coupling 2502 may include a wireline communications protocol. The wireline communications protocol may include at least one of the following: RS-232, RS-485, and a version of Ethernet possibly further supporting a version of High level Data Link Control (HDLC). The traffic monitoring network may support a TS-2 application layer on top of the RS-485 network layer. This application layer may support 19,200 to 600,000 bits per second transfer rates.

The access point 1500 may further include a video camera 1066 video-coupled 1064 with the second computer 1010, as shown in FIG. 6A and FIG. 6B. The video camera 1066 may be used to identify a vehicle 6, which is speeding. When the second computer 1010 calculates the vehicle velocity estimate 1054, is it exceeds a set maximum, the second computer 1010 may trigger the operation of the video camera 1066 to photograph the license plate 9. The traffic report 1056 may include a version of the photograph, as well as the vehicle velocity estimate 1054 and a time-date stamp. The traffic report 1056 may be sent to the traffic monitoring network 2500.

Alternatively, the second memory 1030 may include a non-volatile memory component, which may store the traffic report. The non-volatile memory component storing the traffic report may reside in a removable memory device. Alternatively, the second wireless vehicular sensor node 5000 may include a socket for a removable memory device. Traffic reports may be collected, by inserting a removable memory device in the socket, and transferring them to the removable memory device.

The video camera 1066 may be used to identify the vehicle 6 entering and/or leaving a parking structure or reserved entry area. Each time the access point 1500 determines the entry of a new vehicle in a traffic flow zone 2000, the video camera 1066 may be triggered to photograph the license plate 9. With an overall system strobe of once every millisecond, there is a highly probable, perceptible gap between vehicles entering or leaving.

The preceding embodiments provide examples of the invention and are not meant to constrain the scope of the following claims.

What is claimed is:

1. A method for responding to the presence of a vehicle comprising the step of:

operating a wireless vehicular sensor network (1600) comprising the steps of:

operating at least one wireless vehicular sensor node (500) responding to said presence of said vehicle (6) in said wireless vehicular sensor network, comprising the steps of:

using a vehicle sensor state (104) from a vehicular sensor (2) to create a vehicular sensor waveform (106) based upon said presence of said vehicle by updating a vehicle sensor state queue with said vehicle sensor state, deriving said vehicular sensor waveform from said vehicle sensor state queue, determining a change-in-presence of said vehicle based upon said vehicle sensor state queue, and updating a waveform queue with a waveform characteristic when said change-in-presence is indicated;

generating a report (130) including at least two waveform characteristic (120) of at least two of said vehicular sensor waveform by assembling said report from said waveform queue, and indicating report members of said waveform queue; and operating a transmitter (22) in a transceiver (20) to send said report across at least one wireless physical transport (1510) to an access point (1500) included said wireless vehicular sensor network, to approximate said vehicular sensor waveform at said access point; and operating said access point, comprising the steps:

operating a receiver in a second transceiver (1020) to receive said report; and deriving a vehicle velocity estimate (1054) for at least one of said vehicle from said report.

2. The method of claim 1, wherein said waveform characteristic is one of a rising edge, a falling edge, a waveform duration, and a waveform midpoint.

3. The method of claim 2, wherein said report, further comprises at least one of:

a second of said waveform characteristics of said vehicular sensor waveform;

said waveform characteristic of a second of said vehicular sensor waveforms; and said second waveform characteristic of said second vehicular sensor waveform.

4. The method of claim 3, wherein the step operating said wireless vehicular sensor node further comprises the step:

receiving an acknowledgement of said report from a receiver in said transceiver.

5. The method of claim 4, wherein the step receiving said acknowledgement, further comprises at least one of the steps:

operating said transceiver to receive said acknowledgement;

operating said receiver to receive said acknowledgement;

receiving said acknowledgement from an intermediate node (580); and receiving said acknowledgement from said access point.

6. The method of claim 2, wherein to approximate said vehicular sensor waveform includes to approximate at least one of said waveform characteristics of said vehicular sensor waveform.

7. The method of claim 6, wherein to approximate said vehicular sensor waveform includes to approximate at least two of said waveform characteristics of said vehicular sensor waveform.

8. The wireless vehicular sensor network (1600) of claim 1, comprising:

said wireless vehicular sensor node (500), comprising:

means for using (130) said vehicle sensor state from said vehicular sensor to create said vehicular sensor waveform based upon said presence of said vehicle;

means for operating (140) said transmitter to send said report of said at least one waveform characteristic of said vehicular sensor waveform across said at least one wireless physical transport (1510) to said access point; and said access point (1500).

9. The wireless vehicular sensor network of claim 8, wherein the means for operating said transmitter, further comprises at least one of:

means for operating an ultrasonic transmitter to send said report of said waveform characteristic to said access point;

means for operating a radio transmitter to send said report of said waveform characteristic to said access point; and means for operating an infrared transmitter to send said report of said waveform characteristic to said access point.

10. The wireless vehicular sensor network of claim 9, wherein the means for operating said ultrasonic transmitter, further comprises:

means for operating an ultrasonic transceiver to send said report of said waveform characteristic to said access point;

wherein the means for operating said radio transmitter, further comprises:

means for operating a radio transceiver to send said report of said waveform characteristic to said access point; and wherein the means for operating said infrared transmitter, further comprises:

means for operating an infrared transceiver to send said report of said waveform characteristic to said access point.

11. The wireless vehicular sensor network of claim 8, wherein said radio transceiver implements a version of at least one wireless communications protocol.

12. The wireless vehicular sensor network of claim 11, wherein said wireless communications protocol includes the IEEE 80215 communications standard.

13. The wireless vehicular sensor network of claim 12, wherein said version of said wireless communications protocol includes the IEEE 802154 communications standard.

14. The wireless vehicular sensor network of claim 13, wherein said radio transceiver uses at least one channel of said wireless communications protocol.

15. The wireless vehicular sensor network of claim 8, wherein said vehicular sensor includes a magnetic sensor.

16. The wireless vehicular sensor network of claim 15, wherein said magnetic sensor has a primary sensing axis for sensing said presence of said vehicle used to create said vehicle sensor state.

17. The wireless vehicular sensor network of claim 15, wherein said magnetic sensor uses a form of the magnetic resistive effect to create said vehicle sensor state.

18. The wireless vehicular sensor network of claim 17, wherein said magnetic sensor includes an at least two axis magneto-resistive sensor to create said vehicle sensor state.

19. The wireless vehicular sensor network of claim 18, wherein said magnetic sensor includes a two axis magneto-resistive sensor to create said vehicle sensor state.

20. The wireless vehicular sensor network of claim 18, wherein said magnetic sensor includes a three axis magneto-resistive sensor to create said vehicle sensor state.

21. The wireless vehicular sensor network of claim 8, wherein at least one of said means for using said vehicular sensor and said means for operating said transmitter, includes at least one of a finite state machine, a field programmable logic device, and a computer;

wherein said computer includes at least one instruction processor and at least one data processor directed by at least one of said instruction processors.

22. A method comprising the step making said wireless vehicular sensor network of claim 8, comprising the step:

making said wireless vehicular sensor node, comprising the steps:

inserting a circuit apparatus containing said means of said wireless vehicular sensor node into a plastic shell to content-create a content shell;

wherein said method further comprises at least one of the steps:

gluing said content shell to an indentation in a locally flat surface to create said wireless vehicular sensor node with said glued bond to said indentation in said locally flat surface; and gluing a protective assembly containing said content shell to said locally flat surface to create said wireless vehicular sensor node with said glued bond to said locally flat surface.

23. The method of claim 22, further comprising the step:

filling said content shell with a filler to fill-create a filled shell; and wherein said method, further comprises at least one of the steps:

gluing said filled shell to an indentation in a locally flat surface to create said wireless vehicular sensor node with said glued bond to said indentation in said locally flat surface; and gluing said filled shell to said locally flat surface to glue-create said wireless vehicular sensor node with a glued bond to said locally flat surface.

24. The wireless vehicular sensor node with said glued bond to said locally flat surface and the wireless vehicular sensor node with said glued bond to said indentation in said locally flat surface, as a product of the process of claim 22.

25. The method of claim 1, wherein the step operating said receiver further comprises at least one of the steps:

operating said receiver to receive said report from said wireless vehicular sensor node; and operating said receiver to receive said report via an intermediate node from said wireless vehicular sensor node.

26. The method of claim 1, wherein the step operating said receiver further comprises the step: operating said second transceiver to receive said report.

27. The method of claim 26, wherein the step operating said access point further comprising the step of: operating said second transceiver to send an acknowledgement of said report.

28. The method of claim 27, wherein the step operating said second transceiver to send, further comprises at least one of the steps:

operating said second transceiver to send said acknowledgement to said wireless vehicular sensor node; and operating said second transceiver to send said acknowledgement via an intermediate sensor node to said wireless vehicular sensor node.

29. The acknowledgement, as a product of the process of claim 28.

30. The method of claim 26, wherein the step operating said access point further comprising the step: operating said second transceiver to send a synchronization message to at least one wireless vehicular sensor node included in said wireless vehicular sensor network.

31. The method of claim 30, wherein the step operating said second transceiver to send said synchronization message, further comprises the step: operating said second transceiver to send said synchronization message to each of said wireless vehicular sensor nodes included in said wireless vehicular sensor network.

32. The method of claim 30, wherein said synchronization message includes a global clock count.

33. The method of claim 32, wherein the step operating said access point further comprising the step: maintaining said global clock count.

34. The method of claim 26, wherein said second transceiver includes at least one of: an ultrasonic transmitter, a radio transmitter, and an infra-red transmitter.

35. The method of claim 30, wherein the step operating said second transceiver to send said synchronization signal, further comprises the step: operating said transceiver to send said synchronization message via an intermediate node to said at least one wireless vehicular sensor node.

36. The method of claim 1, wherein said receiver includes at least one of:

an ultrasonic receiver, a radio receiver, and an infra-red receiver.

37. The method of claim 1, wherein the step operating said access point further comprising the step: assembling a traffic report based upon said vehicle velocity estimate.

38. The method of claim 37, wherein the step operating said access point further comprising the step: operating a network transceiver to send said traffic report to a traffic monitoring network.

39. The traffic report, as a product of the process of claim 37.

40. The vehicular sensor waveform, the waveform characteristic, the report, the report received at said access point and the vehicle velocity estimate, as products of the process of claim 1.

41. The method of claim 1, wherein the step operating said wireless vehicular sensor node further comprises the step of: operating at least two of said wireless vehicular sensor nodes, each responding to said presence of said vehicle by generating and sending said report; and wherein the step of operating said receiver further comprises the step of operating said receiver to receive said report from each of at least two of said wireless vehicular sensor nodes;

wherein the step of deriving said vehicle estimate further comprises deriving said vehicle velocity estimate based upon at least two of said reports, each from different of said wireless vehicular sensor nodes.

42. A wireless vehicular sensor network (1600) configured to respond to the presence of a vehicle, comprising:

at least two wireless vehicular sensor nodes (500) each configured to wirelessly receive a global clock count (52) indicated by a synchronization message to maintain a clock count (36) used to operate a vehicle sensor (2) to respond to said presence of said vehicle (6) to generate and send a report (130) via a transceiver (20) across at least one wireless physical transport (1510), with said wireless vehicular sensor nodes further configured to generate said report including at least two vehicular sensor waveforms each including at least two waveform characteristics based upon a vehicle sensor state from a vehicle sensor by updating a vehicle sensor state queue with said vehicle sensor state, deriving said vehicular sensor waveform from said vehicle sensor state queue, determining a change-in-presence of said vehicle based upon said vehicle sensor state queue, and updating a waveform queue with a waveform characteristic when said change-in-presence is indicated, and generate said report by assembling said report from said waveform queue, and indicating report members of said waveform queue; and an access point (1500) including a second transceiver (1020) configured to receive said report across said wireless physical transport, a clock timer (1022) used to create a global clock count used to generate a synchronization message transmitted by said second transceiver across said wireless physical transport to each of said wireless vehicular sensor nodes, and a vehicle velocity estimate (1054) based upon said reports received via said second transceiver, with said reports acknowledged by acknowledgement messages sent said across said wireless physical transport to said wireless vehicle sensor node that originated said report.

43. The wireless vehicular sensor network of claim 42, wherein at least two of said vehicle sensor is a magnetic sensor.

44. The wireless vehicular sensor network of claim 42, wherein said vehicle velocity estimate is used to create a traffic report (1056).

45. The wireless vehicular sensor network of claim 44, wherein said traffic report is configured to be sent to a traffic monitoring network (2500).

* * * * *

UNITED STATES PATENT AND TRADEMARK OFFICE

CERTIFICATE OF CORRECTION

PATENT NO. : 7,739,000 B2
APPLICATION NO. : 11/167810
DATED : June 15, 2010
INVENTOR(S) : Robert Kavaler It is certified that error appears in the above-identified patent and that said Letters Patent is hereby corrected as shown below:

Title page item (75), change the Name of the Inventor to Robert Kavaler from Robert Kevaler.

Signed and Sealed this

Sixteenth Day of November, 2010

David J. Kappos

*Director of the United States Patent and Trademark Office*